US012626639B2

(12) United States Patent
Zhang

(10) Patent No.: US 12,626,639 B2
(45) Date of Patent: May 12, 2026

(54) DISPLAY PANEL AND DISPLAY APPARATUS

(71) Applicants: Wuhan Tianma Microelectronics Co., Ltd., Wuhan (CN); Wuhan Tianma Microelectronics Co., Ltd. Shanghai Branch, Pudong New District (CN)

(72) Inventor: Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 23 days.

(21) Appl. No.: 18/611,995

(22) Filed: Mar. 21, 2024

(65) Prior Publication Data

US 2024/0233626 A1 Jul. 11, 2024

(30) Foreign Application Priority Data

Jul. 26, 2023 (CN) ......................... 202310927155.9

(51) Int. Cl.
*G09G 3/32* (2016.01)

(52) U.S. Cl.
CPC ....... *G09G 3/32* (2013.01); *G09G 2310/0275* (2013.01); *G09G 2310/08* (2013.01); *G09G 2320/0247* (2013.01)

(58) Field of Classification Search
CPC .................. G09G 3/32; G09G 3/3233; G09G 2320/0247; G09G 2310/0275; G09G 2310/08
See application file for complete search history.

(56) References Cited

U.S. PATENT DOCUMENTS 10,096,292 B2 * 10/2018 Chen .................... G09G 3/3614
10,371,996 B2 * 8/2019 Guan .................. H10K 59/131
(Continued)

FOREIGN PATENT DOCUMENTS

CN 112562570 A 3/2021
CN 108806586 B 6/2021
(Continued)

OTHER PUBLICATIONS

Chinese Office Action mailed on Feb. 14, 2026 in Chinese Application No. 202310927155.9, filed on Jul. 26, 2023; 14 pages.

*Primary Examiner* — Olga V Merkoulova
(74) *Attorney, Agent, or Firm* — CHRISTENSEN O'CONNOR JOHNSON KINDNESS PLLC

(57) ABSTRACT

A display panel includes a first sub-region and a second sub-region, a non-display region, a first pixel circuit in the first sub-region, a second pixel circuit in the second sub-region, a first data line at least in the first sub-region, a second data line at least in the second sub-region, and a control circuit in the non-display region and connected to the first data line and the second data line. The first data line is electrically connected to the first pixel circuit. The second data line is electrically connected to the second pixel circuit. In a first mode, a data voltage refresh frequency of the first sub-region is different from that of the second sub-region, the control circuit writes a voltage to the first data line in scanning of the first sub-region and writes a voltage to the second first data line in scanning of the second sub-region.

18 Claims, 25 Drawing Sheets

(56) References Cited

U.S. PATENT DOCUMENTS

| | | | | |
|---|---|---|---|---|
| 11,837,149 | B2 * | 12/2023 | Zong | G09G 3/20 |
| 12,133,432 | B2 * | 10/2024 | Cheng | G09G 3/3233 |
| 2003/0016202 | A1 * | 1/2003 | Edwards | G09G 3/2011 345/98 |
| 2017/0249917 | A1 * | 8/2017 | Chen | G09G 3/3614 |
| 2017/0358264 | A1 * | 12/2017 | Kosuge | G02F 1/133711 |
| 2019/0049770 | A1 * | 2/2019 | Guan | H05K 1/189 |
| 2019/0237021 | A1 * | 8/2019 | Peng | G09G 5/003 |
| 2019/0371243 | A1 * | 12/2019 | Yang | G09G 3/3233 |
| 2023/0196975 | A1 * | 6/2023 | Zong | G06F 3/013 345/55 |
| 2023/0320145 | A1 * | 10/2023 | Cheng | G09G 3/3233 257/91 |

FOREIGN PATENT DOCUMENTS

| | | | |
|---|---|---|---|
| CN | 215265531 | U | 12/2021 |
| CN | 115047991 | A | 9/2022 |
| CN | 115311980 | A | 11/2022 |

* cited by examiner

DISPLAY PANEL AND DISPLAY APPARATUS

CROSS-REFERENCE TO RELATED APPLICATION

The present disclosure claims priority to Chinese patent application Ser. No. 202310927155.9, filed on Jul. 26, 2023, the content of which is incorporated herein by reference in its entirety.

TECHNICAL FIELD

The present disclosure relates to the field of display technologies, and in particular, to a display panel and a display apparatus.

BACKGROUND

In some display modes, a display panel is driven at different frequencies and in different sub-regions. For example, a first sub-region is driven at 0.1 Hz to 1 Hz to display static images such as time information, while a second sub-region is driven at 10 Hz to 60 Hz to display dynamic images such as videos.

When this display mode is applied, in order to ensure normal display of the sub-region with a higher refreshing frequency, data voltages on data lines are continuously refreshed at a high frequency. However, the data voltage on the data line may jump at a high frequency due to the coupling capacitance, so that a significant fluctuation occurs in a gate potential of a driving transistor of a pixel circuit in the sub-region with a lower refreshing frequency, resulting in adverse phenomena such as flickering images shown in the sub-region with a lower refreshing frequency. For example, when the first sub-region is driven by 1 Hz and the second sub-region is driven by 10 Hz, the data voltage on the data line jumps at a high frequency of 10 Hz, so that the static image of the first sub-region is affected by coupling, resulting in flickering images of the first sub-region.

SUMMARY

One aspect of the present disclosure provides a display panel. In an embodiment, the display panel includes a display region including a first sub-region and a second sub-region, a non-display region, pixel circuits including a first pixel circuit and a second pixel circuit, data lines including a first data line and a second data line, and control circuits located in the non-display region. In an embodiment, the first pixel circuit is located in the first sub-region, and the second pixel circuit is located in the second sub-region. In an embodiment, the first data line is at least located in the first sub-region and is electrically connected to the first pixel circuit, and the second data line is at least located in the second sub-region and is electrically connected to the second pixel circuit. In an embodiment, a control circuit of the control circuits is electrically connected to the first data line and the second data line. In an embodiment, the display panel has a first mode. In an embodiment, in the first mode, a data voltage refresh frequency of the first sub-region is a first frequency, a data voltage refresh frequency of the second sub-region is a second frequency, the first frequency is different from the second frequency, the control circuit is configured to write a voltage to the first data line in the scanning of the first sub-region and write a voltage to second first data line in the scanning of the second sub-region.

Another aspect of the present disclosure provides a display apparatus. In an embodiment, the display apparatus includes a display panel. In an embodiment, the display panel includes a display region including a first sub-region and a second sub-region, a non-display region, pixel circuits including a first pixel circuit and a second pixel circuit, data lines including a first data line and a second data line, and control circuits located in the non-display region. In an embodiment, the first pixel circuit is located in the first sub-region, and the second pixel circuit is located in the second sub-region. In an embodiment, the first data line is at least located in the first sub-region and is electrically connected to the first pixel circuit, and the second data line is at least located in the second sub-region and is electrically connected to the second pixel circuit. In an embodiment, a control circuit of the control circuits is electrically connected to the first data line and the second data line. In an embodiment, the display panel has a first mode. In an embodiment, in the first mode, a data voltage refresh frequency of the first sub-region is a first frequency, a data voltage refresh frequency of the second sub-region is a second frequency, the first frequency is different from the second frequency, the control circuit is configured to write a voltage to the first data line in the scanning of the first sub-region and write a voltage to second first data line in the scanning of the second sub-region.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in some embodiments of the present disclosure are merely for the purpose of describing specific embodiment, rather than limiting the present disclosure. The terms "a", "an", "the" and "said" in a singular form in some embodiments of the present disclosure and the attached claims are further intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

Figure 1:
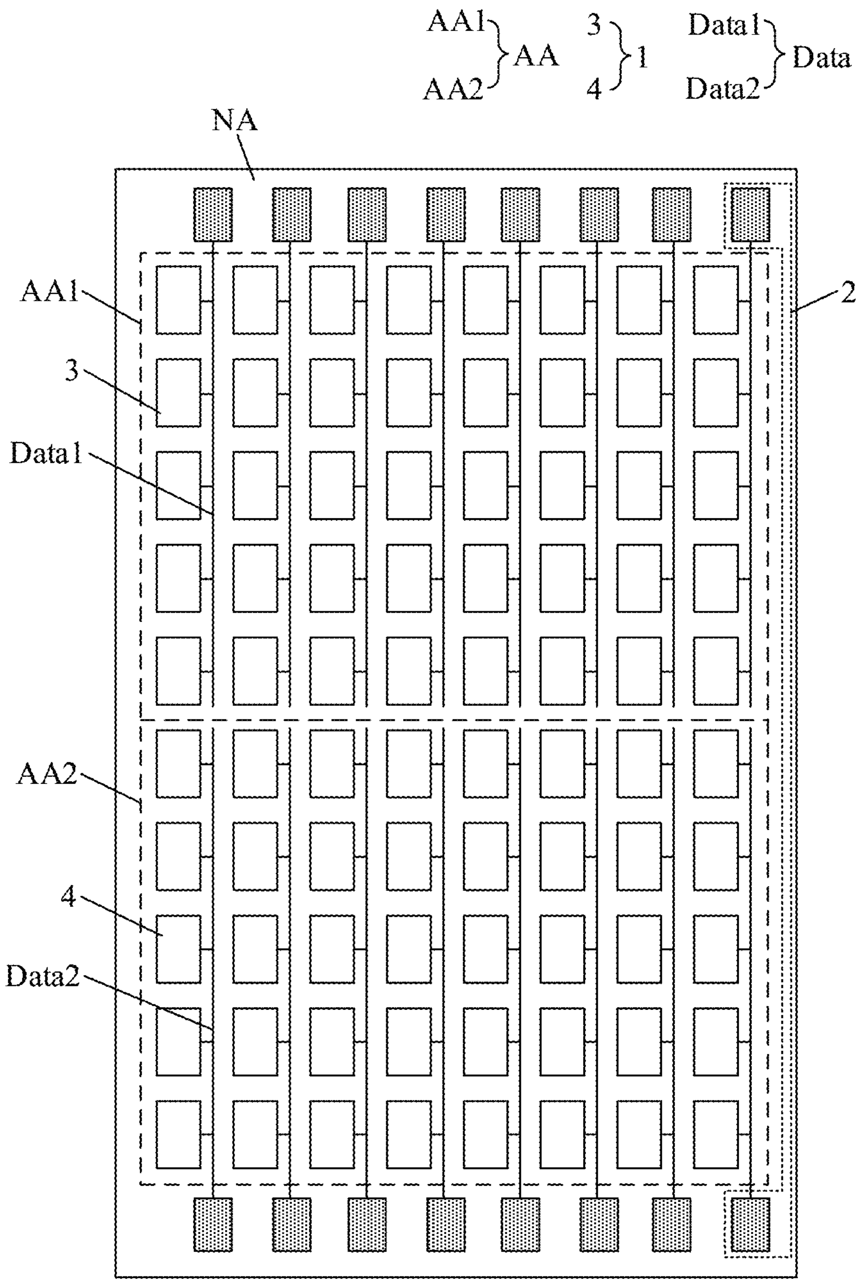
FIG. 1 is a top view of a display panel according to some embodiments of the present disclosure.
Figure 2:
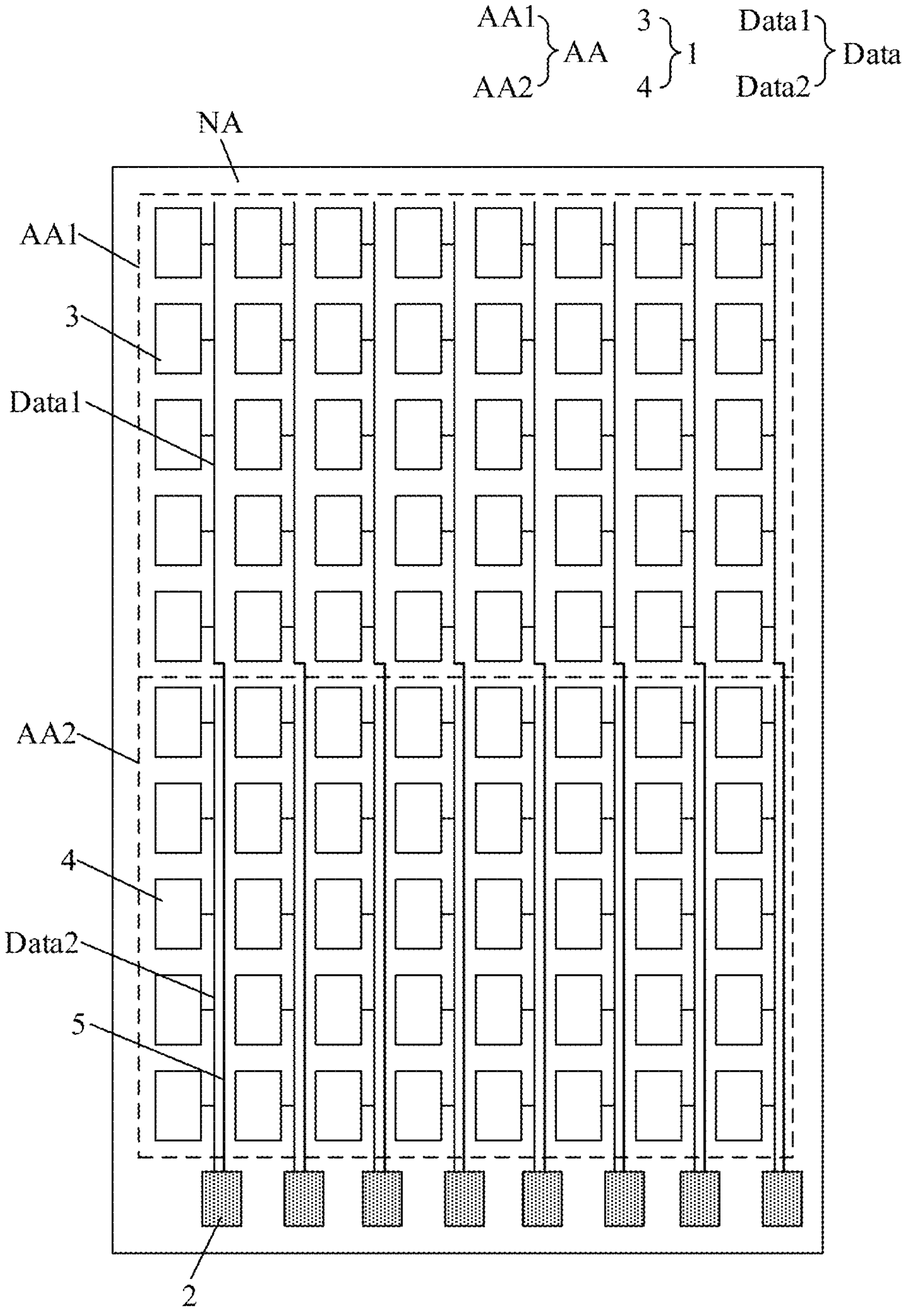
FIG. 2 is a top view of another display panel according to some embodiments of the present disclosure.

The present disclosure provides a display panel. FIG. 1 is a top view of a display panel according to some embodiments of the present disclosure, and FIG. 2 is a top view of another display panel according to some embodiments of the present disclosure. As shown in FIG. 1 and FIG. 2, the display panel includes a display region AA and a non-display region NA. The display region AA includes a first sub-region AA1 and the second sub-region AA2.

The display panel further includes multiple pixel circuits 1, multiple data lines Data and multiple control circuits 2.

Multiple pixel circuits 1 include a first pixel circuit 3 and a second pixel circuit 4. The first pixel circuit 3 is located in the first sub-region AA1, and the second pixel circuit 4 is located in the second sub-region AA2.

Multiple data lines Data include a first data line Data1 and a second data line Data2. The first data line Data1 is at least located in the first sub-region AA1 and electrically connected to the first pixel circuit 3. The second data line Data2 is at least located in the second sub-region AA2 and electrically connected to the second pixel circuit 4.

Multiple control circuits 2 are located in the non-display region NA. The control circuit 2 is electrically connected to the first data line Data1 and the second data line Data2.

The display panel has a first mode. In the first mode, the data voltage of the first sub-region AA1 is refreshed at a first frequency, and the data voltage of the second sub-region AA2 is refreshed at a second frequency. The first frequency is different from the second frequency. That is, in the first mode, the first sub-region AA1 and the second sub-region AA2 are displayed with different refreshing frequencies. The control circuit 2 is configured to write voltage to the first data line Data1 during scanning of the first sub-region AA1, and to write the voltage to the second data line Data2 during scanning of the second sub-region AA2.

Figure 3:
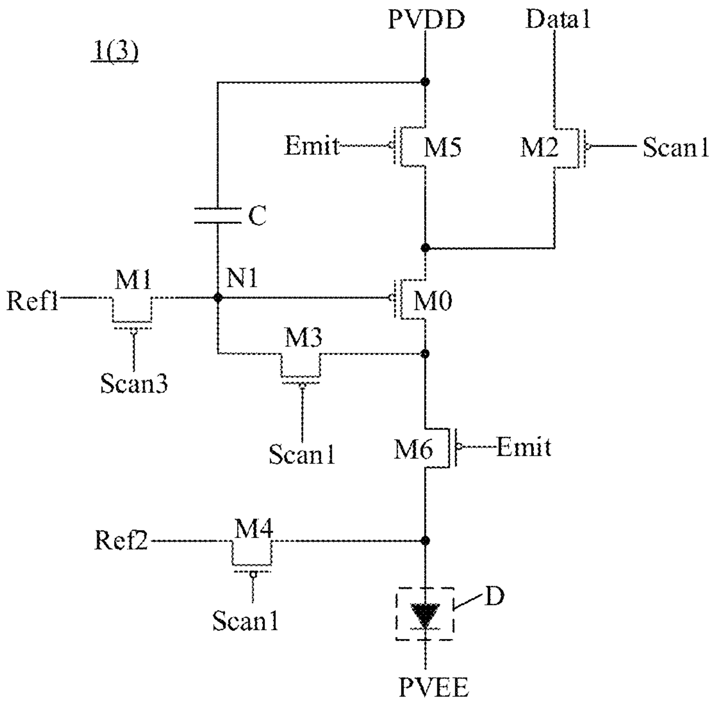
FIG. 3 is a schematic diagram of a first pixel circuit according to some embodiments of the present disclosure.
Figure 4:
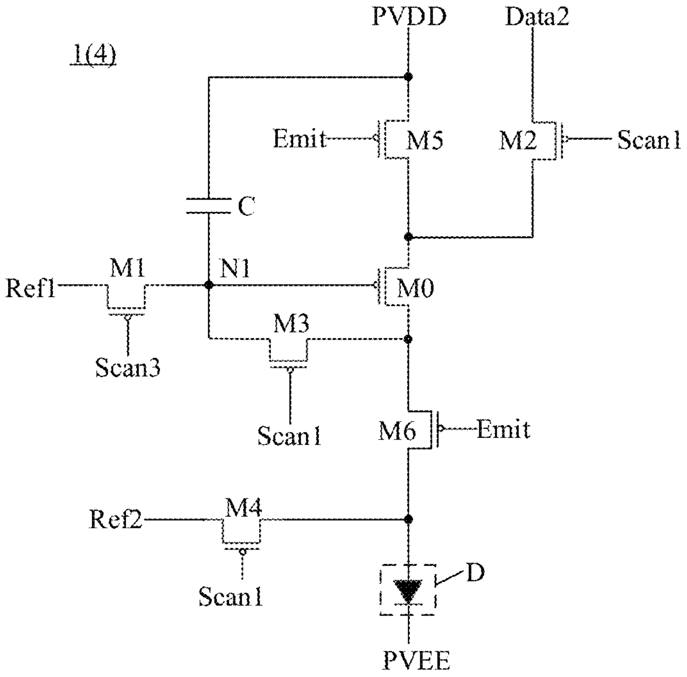
FIG. 4 is a schematic diagram of a second pixel circuit according to some embodiments of the present disclosure.

As shown FIG. 3, scanning of the first sub-region AA1 refers to a process of scanning first pixel circuits 3 by first scan signal lines Scan1 electrically connected to data writing transistors M2 in the first pixel circuits 3. As shown in FIG. 4, scanning the second sub-region AA2 refers to a process of scanning second pixel circuits 4 by first scan signal lines Scan1 electrically connected to data writing transistors M2 in the second pixel circuits 4. This process will be explained in detail in hereinafter embodiments.

In some embodiments of the present disclosure, the first pixel circuit 3 in the first sub-region AA1 and the second pixel circuit 4 in the second sub-region AA2 are respectively connected to the first data line Data1 and the second data line Data2 that are independently controlled. In this way, the first pixel circuit 3 is only driven by the first data line Data1, and the second pixel circuit 4 is only driven by the second data line Data2. As an example, the first sub-region AA1 is driven by a low frequency and the second sub-region AA2 is driven by a high frequency. When the second sub-region AA2 is driven with the high frequency, only the data voltage on the data line Data2 jumps at a high frequency. Since the second data line Data2 is not connected to the first pixel circuit 3 or even does not extend into the first sub-region AA1, there is a very small or even no coupling between the second data line Data2 and the connection node of the gate electrode of the driving transistor M0 in the first pixel circuit 3, so that the high-frequency jump of the data voltage on the second data line Data2 has little affecting on the gate potential of the driving transistor M0 in the first pixel circuit 3, which can effectively improve the flickering problem existed in the sub-region refreshed at a low frequency.

It should be noted that the "driving at a high frequency" and "driving at a low frequency" described in the embodiments of the present disclosure are just for clearly distinguishing the magnitudes of the driving frequencies of the first sub-region AA1 and the second sub-region AA2. The high frequency and low frequency are based on the relative magnitudes of the first and second frequencies. For example, when the first frequency is 1 Hz, and the second frequency is 10 Hz, the second frequency is higher compared with the first frequency, so that in the embodiments of the present disclosure, the second sub-region AA2 is driven at a high frequency, and the first sub-region AA1 is driven at a low frequency. In some embodiments of the present disclosure, the first and second frequencies can be any frequencies. For example, the lower one in the first and second frequencies can be between 0.1 Hz to 1 Hz, and the higher one can be 10 Hz to 60 Hz, or, the lower one in the first frequency and the second frequency can be between 10 Hz to 60 Hz, and the higher one can be between 60 Hz to 120 Hz.

For an conventional structure, when the difference between the driving frequencies of the two sub-regions is relatively small, for example, the two sub-regions are driven by 1 Hz and 10 Hz, respectively, and the voltage on the data line is refreshed at a frequency of 10 Hz, the coupling affects the image displayed by the sub-region corresponding to 1 Hz greater, and the flickering situation of the sub-region corresponding to 1 Hz will be more serious. When the difference between the driving frequencies of the two sub-regions is relatively large, for example, the two sub-regions are driven by 1 Hz and 120 Hz, respectively, and the voltage on the data line is refreshed at a frequency of 120 Hz, since the data voltage refreshing frequency is too fast, the flickering of the image displayed by the sub-region corresponding to 1 Hz may not be so obvious and may not be recognized by human eyes. To this end, based on the conventional structure, in order to weaken the flickering of the sub-region driven at a low frequency, it is advantageous to set a sufficiently large difference between the driving frequencies of the two sub-regions, but this will bring greater restrictions on the driving frequencies of the two sub-regions.

In the technical solution provided by the embodiments of the present disclosure, the structure of the data line itself can improve the flickering phenomenon of the low-frequency sub-region, so that the present disclosure can further overcome the limitation problems caused by the driving frequencies of the two sub-regions. In some embodiments of the present disclosure, the difference between the driving frequencies of the two sub-regions can be small or large, and the design of the driving frequencies for different sub-regions will be more flexible.

In some embodiments, referring to FIG. 2 again, the control circuit 2 is located in the non-display region NA and on a side adjacent to the second sub-region AA2. The control circuit 2 is electrically connected to the first data line Data1 by the connection line 5. The connection line 5 is at least located in the second sub-region AA2, so that the connection line 5 can be used to form a signal transmission path between the control circuit 2 and the first data line Data1, and the first sub-region AA1 can receive the data voltage normally.

Moreover, in this structure, the control circuit 2 is adjacent to the second data line Data2, and the second data line Data2 is directly connected to the control circuit 2. The second data line Data2 is not required to extend into the first sub-region AA1. It is not necessary to provide, for the second data line Data2, a connection line that extends in the first sub-region AA1 and is configured to realize the connection between the second data line Data2 and the control circuit 2. In this structure, there is almost no coupling between the second data line Data2 and the connection node of the gate electrode of the driving transistor M0 in the first pixel circuit 3. When the first sub-region AA1 is refreshed using a low frequency and the second sub-region AA2 is refreshed using a high frequency, the high-frequency jump of the data voltage on the second data line Data2 almost does not affect the stability of the gate potential of the driving transistor M0 in the first pixel circuit 3. When the first sub-region AA1 is refreshed using a high frequency and the second sub-region AA2 is refreshed using a low frequency, although the connection line 5 connected to the first data line Data1 extends within the second sub-region AA2, the coupling between the connection line 5 and the connection node of the gate electrode of the driving transistor M0 in the second pixel circuit 4 may be smaller. This is because the connection line 5 is not connected to the second pixel circuit 4. Moreover, the wiring position and the layer position of the connection line 5 can be designed, so that the influence of the high-frequency jump of data voltage on the connection line 5 on the gate potential of the driving transistor M0 in the second pixel circuit 4 can be improved.

Furthermore, when the control circuit 2 is adjacent to the second data line Data2, combined with the above analysis, in order to improve the flickering phenomenon of the 1 sub-region refreshed at a low frequency more significantly, the present disclosure can set the second frequency to be greater than the first frequency, that is, the first sub-region AA1 is designed to be a sub-region refreshed at a low frequency, and the second sub-region AA2 is designed to be a sub-region refreshed at a high frequency.

Figure 5:
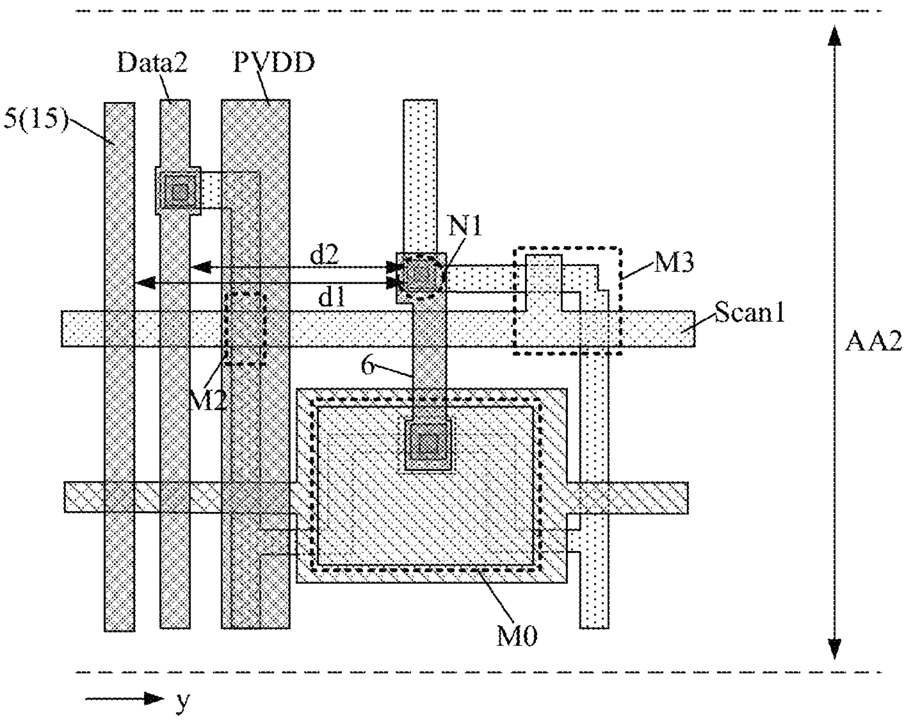
FIG. 5 is a schematic diagram showing some layers of a display panel according to some embodiments of the present disclosure.

FIG. 3 is a schematic diagram of a first pixel circuit according to some embodiments of the present disclosure, FIG. 4 is a schematic diagram of a second pixel circuit according to some embodiments of the present disclosure, and FIG. 5 is a partial structural diagram showing layers of a display panel according to some embodiments of the present disclosure. When the control circuit 2 is electrically connected to the first data line Data1 through the connection line 5, in some embodiments, as shown in FIG. 3 to FIG. 5, the pixel circuit 1 includes a driving transistor M0 and a threshold compensation transistor M3. A gate electrode of the driving transistor M0 is electrically connected to the second electrode of the threshold compensation transistor M3 through an auxiliary connection segment 6. A first connection node N1 is located between the auxiliary connection segment 6 and the second electrode of the threshold compensation transistor M3. The first connection node N1 is the connection node of the gate electrode of the driving transistor M0.

The connection line 5 includes a first segment 15. The first segment 15 is located in the second sub-region AA2 and extends in the same direction as the second data line Data2. A minimum distance d1 between the first connection node N1 in the second pixel circuit 4 and the first segment 15 is greater than a minimum distance d2 between the first connection node N1 in the second pixel circuit 4 and the second data line Data2. The minimum distance between the first connection node N1 and the first segment 15 or the second data line Data2 refers to a distance between the first connection node N1 and the first segment 15 or the second data line Data2 in the second direction Y. The second direction Y intersects the arrangement direction of the first sub-region AA1 and the second sub-region AA2.

In the above structure, by increasing a horizontal distance between the first segment 15 in the connection line 5 and the first connection node N1 in the second pixel circuit 4, the coupling between the first segment 15 and the first connection node N1 of the second pixel circuit 4 can be reduced, so that the influence of the jump of data voltage on the connection line 5 on the potential of the first connection node N1 in the second pixel circuit 4 is weakened. Especially when the first sub-region AA1 is driven at a high frequency and the second sub-region AA2 is driven at a low frequency, the flickering phenomenon in the second sub-region AA2 can be effectively improved.

Figure 6:
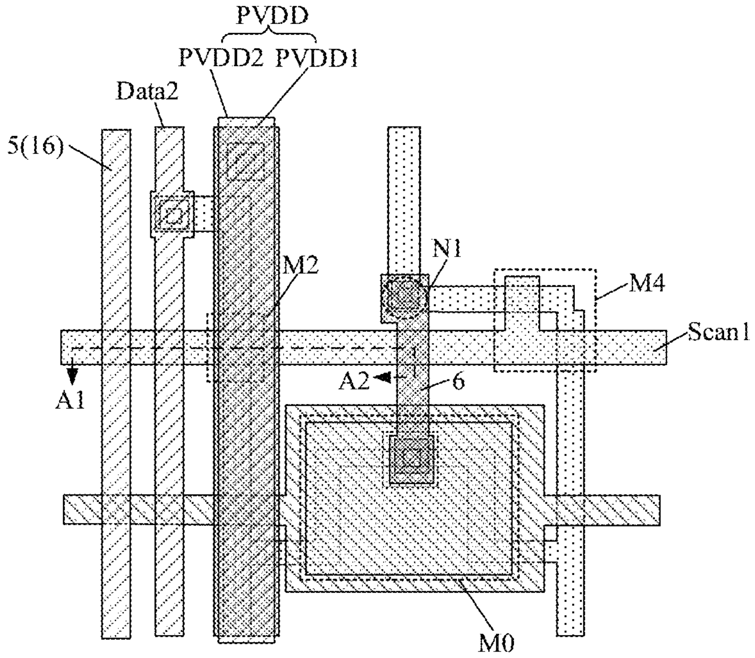
FIG. 6 is a schematic diagram showing some layers of a display panel according to some embodiments of the present disclosure.
Figure 7:
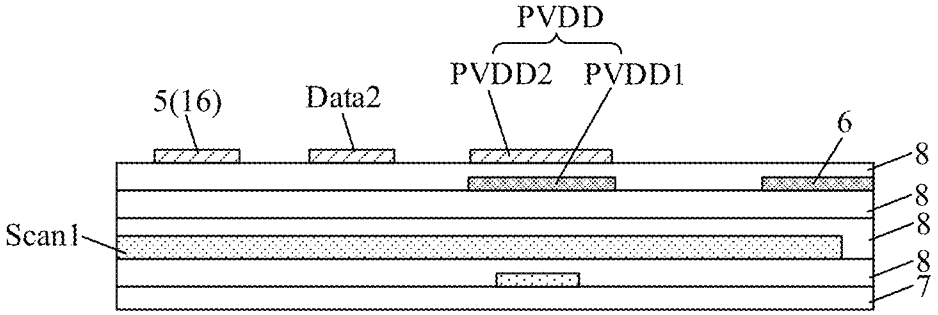
FIG. 7 is a cross-sectional view taken along line A1-A2 shown in FIG. 6 according to embodiments of the present disclosure.

FIG. 6 is a partial structural diagram showing layers of a display panel according to some embodiments of the present disclosure, and FIG. 7 is a cross-sectional view taken along line A1-A2 shown in FIG. 6. When the control circuit 2 is electrically connected to the first data line Data1 by the connection line 5, in some embodiments, combined with FIG. 3 and FIG. 4, as shown in FIG. 6 and FIG. 7, the pixel circuit 1 includes a driving transistor M0 and a threshold compensation transistor M3. A gate electrode of the driving electrode M0 is electrically connected to the second electrode of the threshold compensation transistor M3 through an auxiliary connection segment 6. The connection line 5 includes a first segment 15. The first segment 15 is located in the second sub-region AA2 and extends in a same direction as the second data line Data2. In addition, the layer of the first segment 15 is located on a side of the layer of the auxiliary connection segment 6 toward the light-emitting direction of the display panel.

In the above structure, the layer of the first segment 15 is placed on a side of the layer of the auxiliary connection segment 6 toward the light-emitting direction of the display panel, similarly, the coupling between the first segment 15 and the first connection node N1 in the second pixel circuit 4 can be reduced, the influence of the jump of data voltage on the connection line 5 on the potential of the first connection node N1 in the second pixel circuit 4 is weakened. Especially when the first sub-region AA1 is driven at a high frequency and the second sub-region AA2 is driven at a low frequency, the flickering phenomenon in the second sub-region AA2 can be effectively improved.

Furthermore, combined with FIG. 3 and FIG. 4, referring to FIG. 6 and FIG. 7 again, the pixel circuit 1 is further electrically connected to a power supply signal line PVDD. The pixel circuit 1 includes a first light-emitting control transistor M5 and a storage capacitor C. A first electrode of the first light-emitting control transistor M5 and a first electrode plate of the storage capacitor C are electrically connected to the power supply signal line PVDD.

The power supply signal line PVDD includes a first power supply line PVDD1 and a second power supply line PVDD2 that are electrically connected. The first power supply line PVDD1 and the second power supply line PVDD2 extends in the same direction as the second data line Data2. The first power supply line PVDD1 is provided in a same layer as the auxiliary connection segment 6. The layer of the second power supply line PVDD2 is located on a side of the layer of the first power supply line PVDD1 toward the light-emitting direction of display panel. The first segment 15 is provided in a same layer as the second power supply line PVDD2.

In such configuration, the power supply signal line PVDD is arranged in two layers: the first segment 15 is provided in a same layer as the second power supply line PVDD2 that is closer to the light-emitting surface, so that the coupling between the first segment 15 and the first connection node N1 of the second pixel circuit 4 is reduced, and the layout design of the first segment 15 can be further optimized. In this way, the first segment 15 does not needs an additional patterning step.

Figure 8:
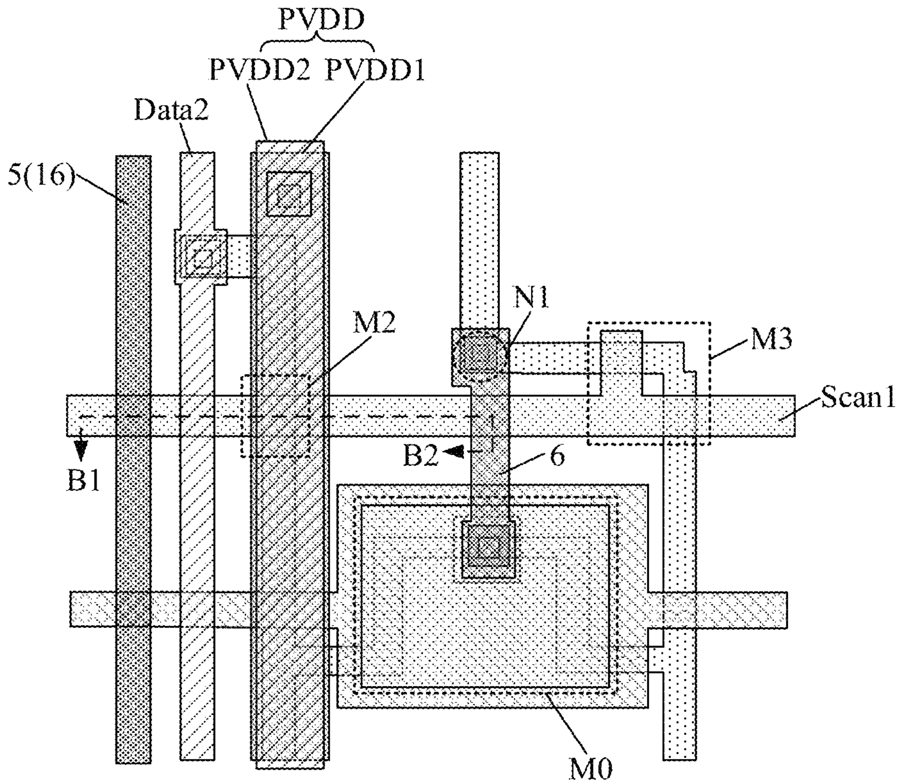
FIG. 8 is a schematic diagram showing some layers of a display panel according to some embodiments of the present disclosure.
Figure 9:
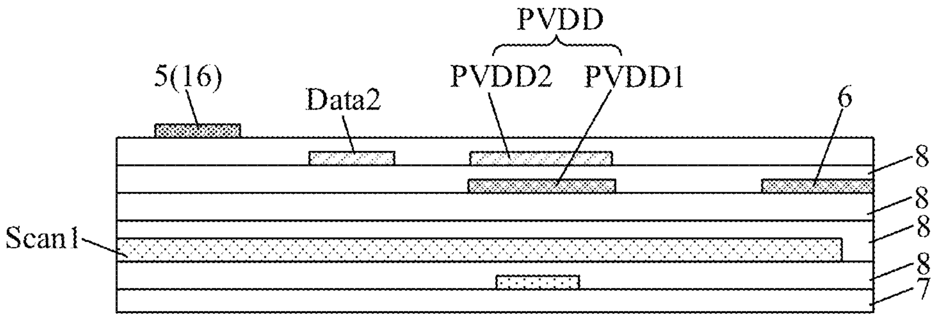
FIG. 9 is a cross-sectional view taken along line B1-B2 shown in FIG. 8 according to embodiments of the present disclosure.

FIG. 8 is a partial structural diagram showing layers of a display panel according to some embodiments of the present disclosure, and FIG. 9 is a cross-sectional view taken along line B1-B2 shown in FIG. 8. Alternatively, combined with FIG. 3 and FIG. 4, as shown in FIGS. 8 and 9, the pixel circuit 1 is further electrically connected to a power supply signal line PVDD. The pixel circuit 1 includes a first light-emitting control transistor M5 and a storage capacitor C. A first electrode of the first light-emitting control transistor M5 and a first electrode plate of the storage capacitor C are electrically connected to the power supply signal line PVDD.

The power signal line PVDD includes a first power supply line PVDD1 and a second power supply line PVDD2 that are electrically connected, and the first power supply line PVDD1 and the second power supply line PVDD2 extends in a same direction as the second data line Data2. The first power supply line PVDD1 and the auxiliary connection segment 6 are provided in a same layer, and the layer of the second power supply line PVDD2 is located on a side of the layer of the first power supply line PVDD1 toward a light-emitting direction of the display panel. The layer of the first segment 15 is located on a side of the layer of the second power supply line PVDD2 toward the light-emitting direction of the display panel.

In such configuration, similarly, the power supply signal line PVDD is arranged in two layers, the first segment 15 is provided on a side of the second power supply line PVDD2 toward the light-emitting direction of the display panel. At this time, the layer of the first segment 15 is farther away from the first connection node N1 of the second pixel circuit 4, so that the coupling between the first segment 15 and the first connection node N1 of the second pixel circuit 4 is smaller.

In addition, referring to FIGS. 6 and 8 again, the display panel further includes a substrate 7 and multiple insulation layers 8, which will not be elaborated here.

In addition, referring to FIGS. 6 and 8 again, when the power supply signal line PVDD is arranged in two layers, the second data line Data2 can be provided in a same layer as the second power supply line PVDD2 closer to the light-emitting surface, to reduce the coupling between the second data line Data2 and a scan signal line, e.g., the coupling with a first scan signal lines Scan1.

Figure 10:
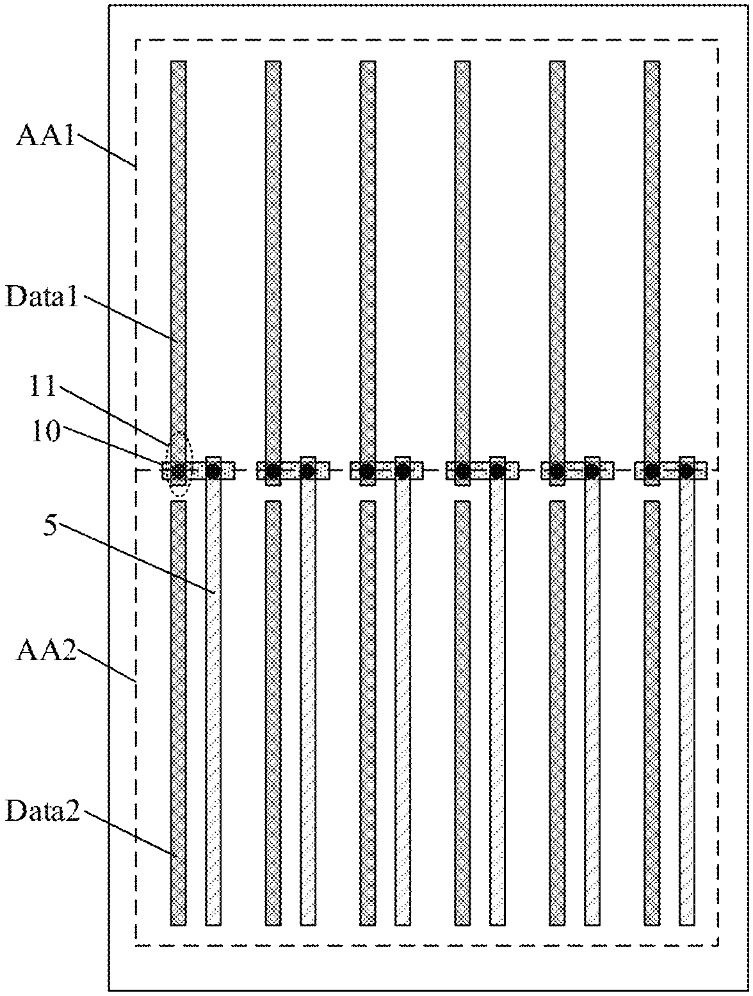
FIG. 10 is a top view of a display panel according to some embodiments of the present disclosure.

FIG. 10 is a top view of a display panel according to some embodiments of the present disclosure. When the control circuit 2 is electrically connected to the first data line Data1 through the connection line 5, in some embodiments, as shown in FIG. 10, an end of the first data line Data1 closer to the second data line Data2 is a first end 11. The connection line 5 extends in a same direction as the second data line Data2, one end of the connection line 5 is connected to the control circuit 2, and the other end of the connection line 5 is adjacent to the first end 11 and is connected to the first end 11 through a first connector 10.

In such configuration manner, the connection line 5 only extends to the boundary between the first sub-region AA1 and the second sub-region AA2, and does not further extend into the first sub-region AA1. At this time, the extending distance of the connection line 5 is relatively short, and the load is small, and the connection line 5 transmits the voltage to the first data line Data1 directly at the bottom of the first data line Data1, and the speed for receiving the voltage by the first data line Data1 is larger.

Figure 11:
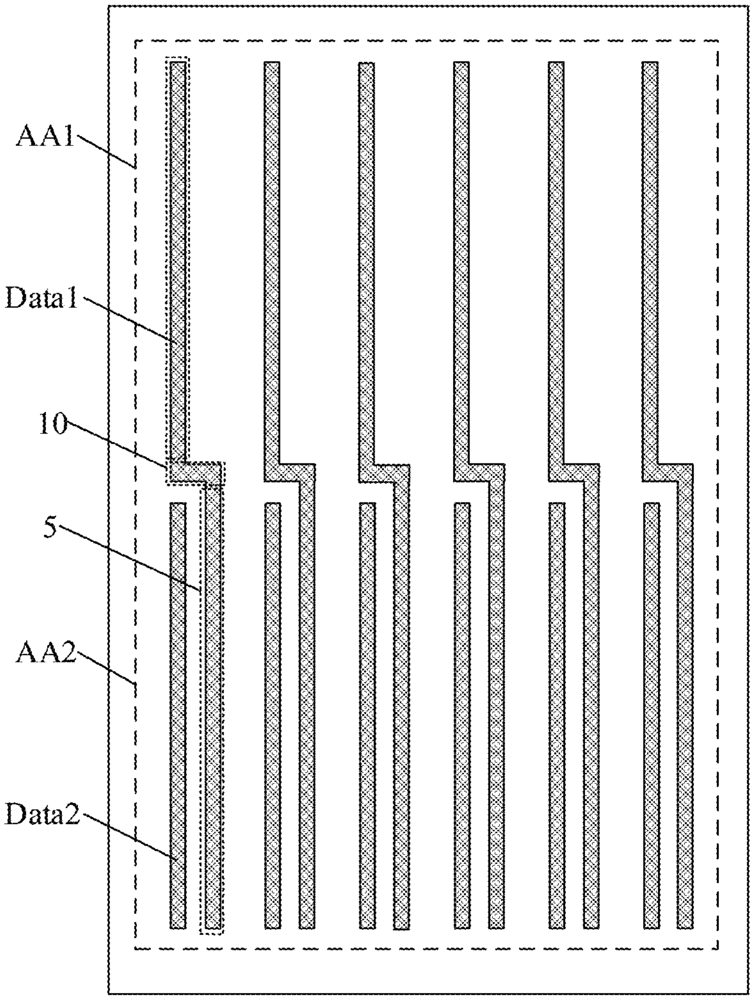
FIG. 11 is a top view of a display panel according to some embodiments of the present disclosure.

It should be noted that when the connection line 5 only extends near the boundary between the first sub-region AA1 and the second sub-region AA2, in one embodiment, referring to FIG. 10, the first data line Data1 can be provided in a different layer from the connection line 5. Further, one of the first data line Data1 and the connection line 5 can be provided in a same layer as the second data line Data2. FIG. 11 is a top view of a display panel according to some embodiments of the present disclosure. Alternatively, in another embodiment, as shown in FIG. 11, the first data line Data1, the first connector 10 and the connection line 5 may be provided in a same layer, that is, the first data line Data1, the first connector 10 and the connection line 5 are one continuous line formed by a same patterning process. Further, the first data line Data1 and the second data line Data2 can be provided in a same layer or different layers.

Figure 12:
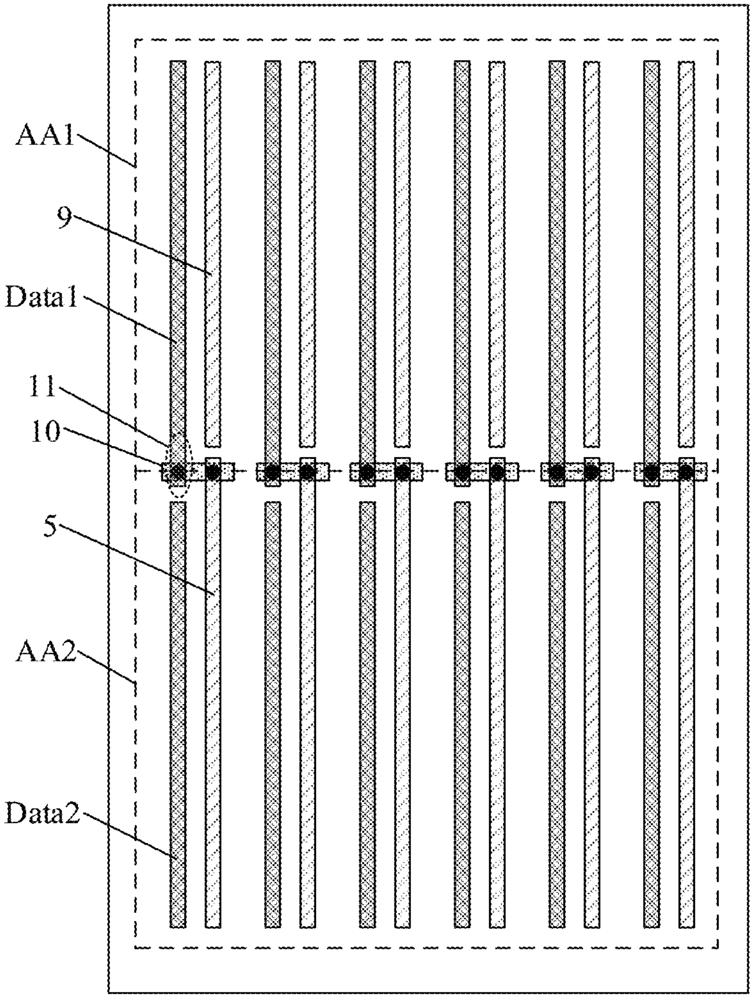
FIG. 12 is a top view of a display panel according to some embodiments of the present disclosure.

FIG. 12 is a top view of a display panel according to some embodiments of the present disclosure. In some embodiments, as shown in FIG. 12, the display panel further includes the first wiring 9 located in the first sub-region AA1. At least one first wiring 9 is arranged in an extension direction of the connection line 5.

When the connection line 5 only extends to the boundary between the first sub-region AA1 and the second sub-region AA2, the first wiring 9 aligned with the connection line 5 in a longitudinal direction is provided in the first sub-region AA1, so that the uniformity of pattern density of wirings in the first sub-region AA1 and the second sub-region AA2 can be improved, thereby avoiding poor display caused by significant difference of pattern density at the boundary between the first sub-region AA1 and the second sub-region AA2.

Further, the first wiring 9 receives a fixed voltage, so that the first wiring 9 further functions as a shielding layer to stabilize the potential on the node or wirings in the first pixel circuit 3. In some embodiments of the present disclosure, the first wiring 9 can be connected to at least one of the power supply signal line PVDD, the gate reset signal line Ref1 and the anode reset signal line Ref2.

Figure 13:
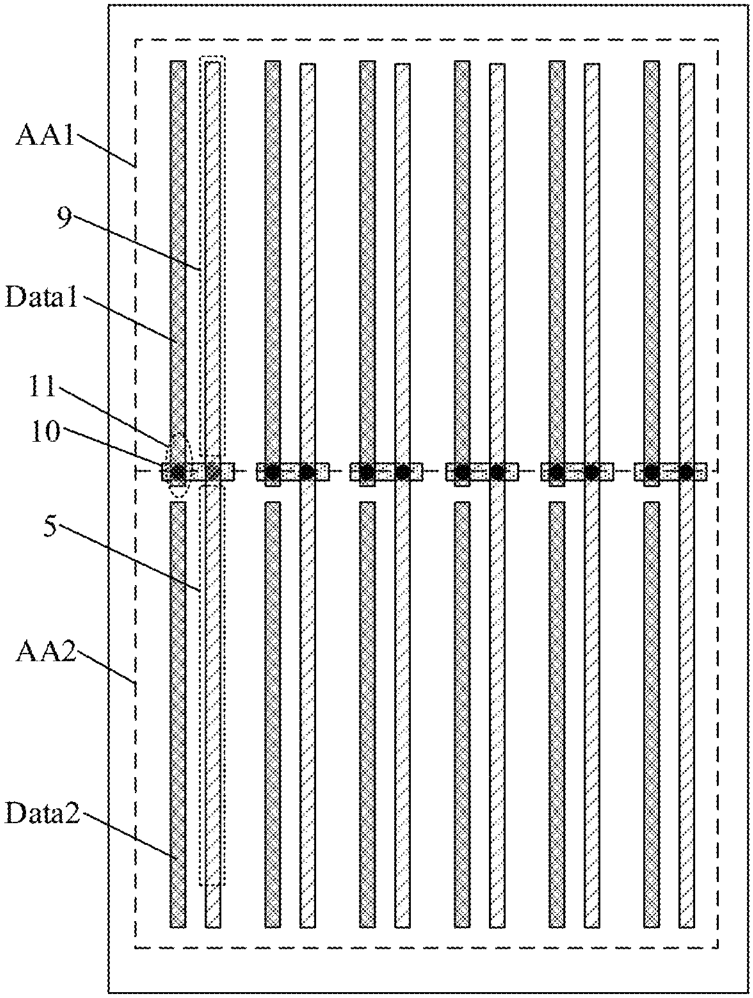
FIG. 13 is a top view of a display panel according to some embodiments of the present disclosure.

FIG. 13 is a top view of a display panel according to some embodiments of the present disclosure. As shown in FIG. 13, in some embodiments, the first wiring 9 can further be connected to the connection line 5 to receive the voltage on the connection line 5.

Figure 14:
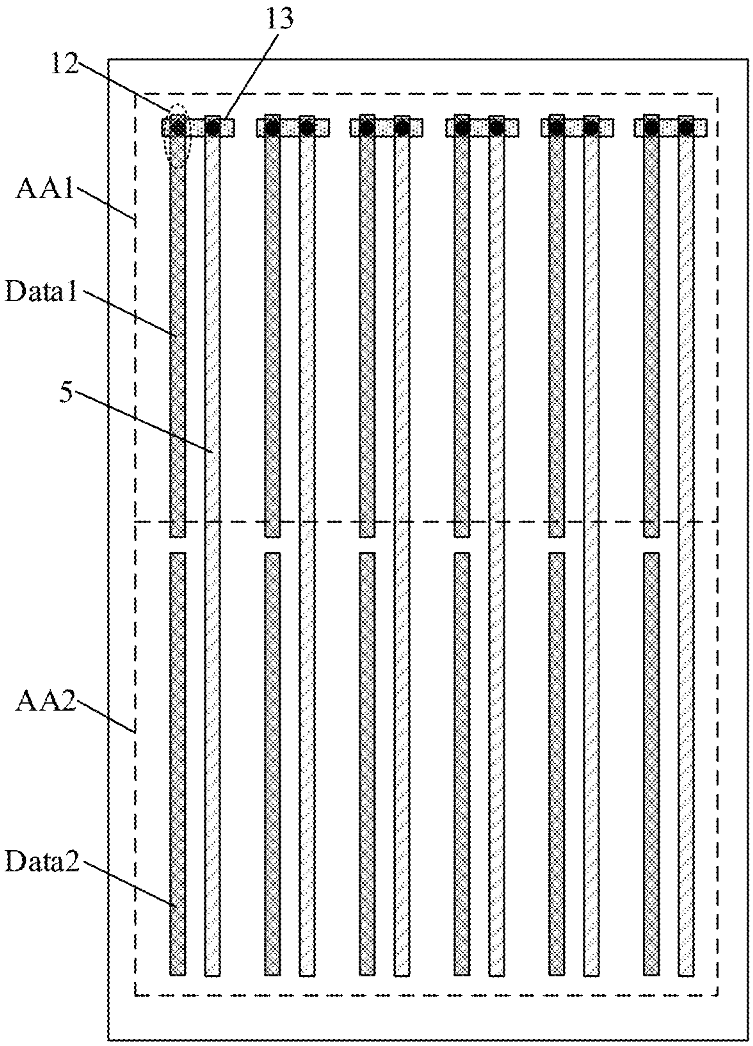
FIG. 14 is a top view of a display panel according to some embodiments of the present disclosure.

FIG. 14 is a top view of a display panel according to some embodiments of the present disclosure. When the control circuit 2 is electrically connected to the first data line Data1 through the connection line 5, in another embodiment, as shown in FIG. 14, the end of the first data line Data1 away from the second data line Data2 is the second end 12. One end of the connection line 5 is electrically connected to the control circuit 2, and the other end of the connection line 5 is adjacent to the second end 12 and is connected to the second end 12 through a second connector 13. At this time, the connection line 5 can extend to a side of the first sub-region AA1 away from the second sub-region AA2. The uniformity of pattern density of the wirings in the first sub-region AA1 and the second sub-region AA2 is better.

Figure 15:
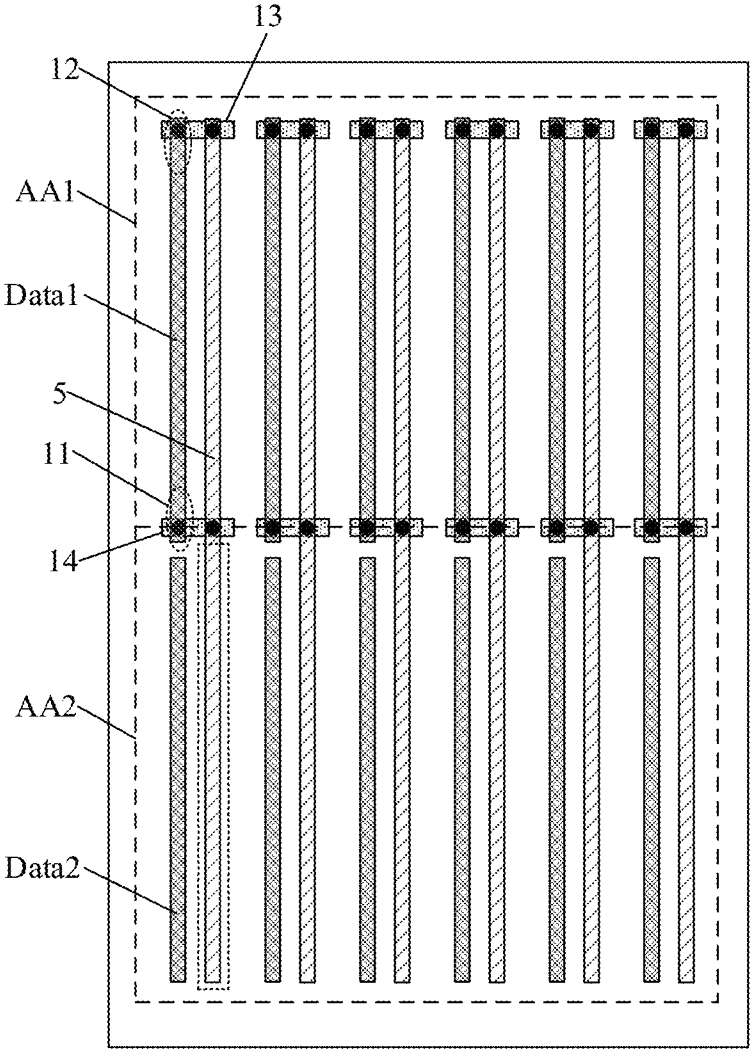
FIG. 15 is a top view of a display panel according to some embodiments of the present disclosure.

FIG. 15 is a top view of a display panel according to some embodiments of the present disclosure. In some embodiments, as shown in FIG. 15, the end of the first data line Data1 adjacent to the second data line Data2 is a first end 11, and the connection line 5 is further connected to the first end 11 through a third connector 14. At this time, the first data line Data1 is electrically connected in parallel with the first connection line 5. Such configuration can reduce the load of the connection line 5, thereby reducing a load difference between the second data line Data2 and an overall wiring constituted by the first data line Data1 and the connection line 5.

Figure 16:
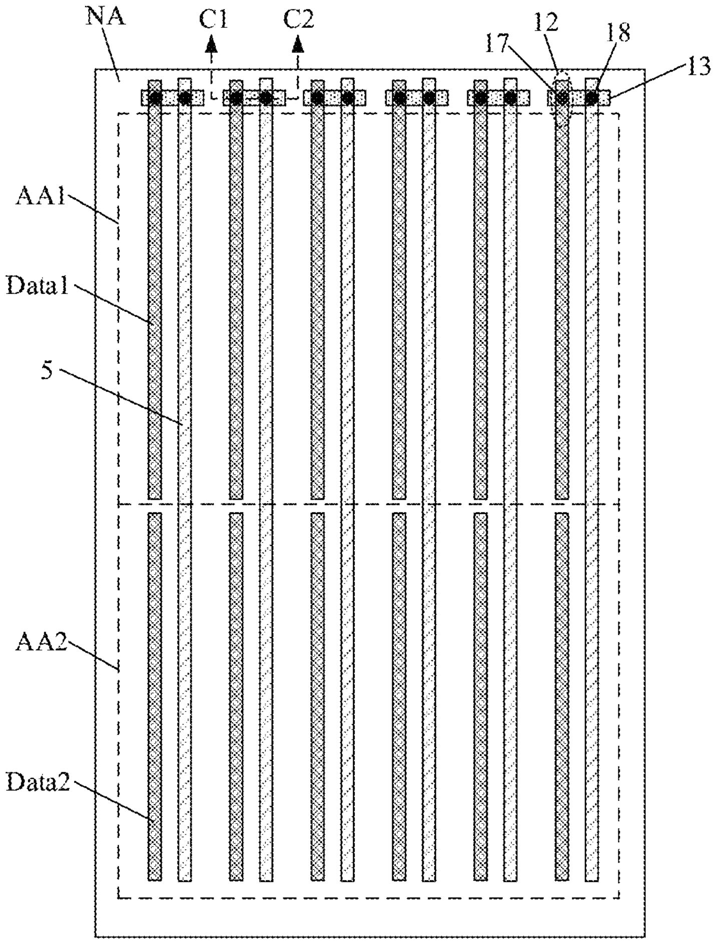
FIG. 16 is a top view of a display panel according to some embodiments of the present disclosure.
Figure 17:
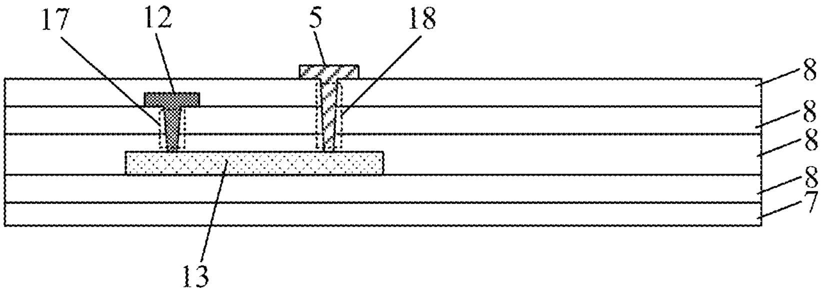
FIG. 17 is a cross-sectional view taken along line C1-C2 shown in FIG. 16 according to embodiments of the present disclosure.

FIG. 16 is a top view of a display panel according to some embodiments of the present disclosure, and FIG. 17 is a cross-sectional view taken along line C1-C2 shown in FIG. 16. In some embodiments, as shown in FIG. 16 and FIG. 17, a first conductive via 17 is provided between the second connector 13 and the second end 12, and a second conductive via 18 is provided between the second connector 13 and the connection line 5. The first conductive via 17 and the second conductive via 18 are located at a side of the non-display region NA adjacent to the first sub-region AA1. Since the second conductive via 18 is located at a side of the non-display region NA adjacent to the first sub-region AA1, it is avoided that the connection via between the connection line 5 and the first data line Data 1 is arranged in the display region AA, thereby avoiding that the connection via is visible to human eyes due to the reflection at the connection via, and further avoiding that the arrangement of other original wirings are required to adjust in order to avoid the connection via.

Figure 18:
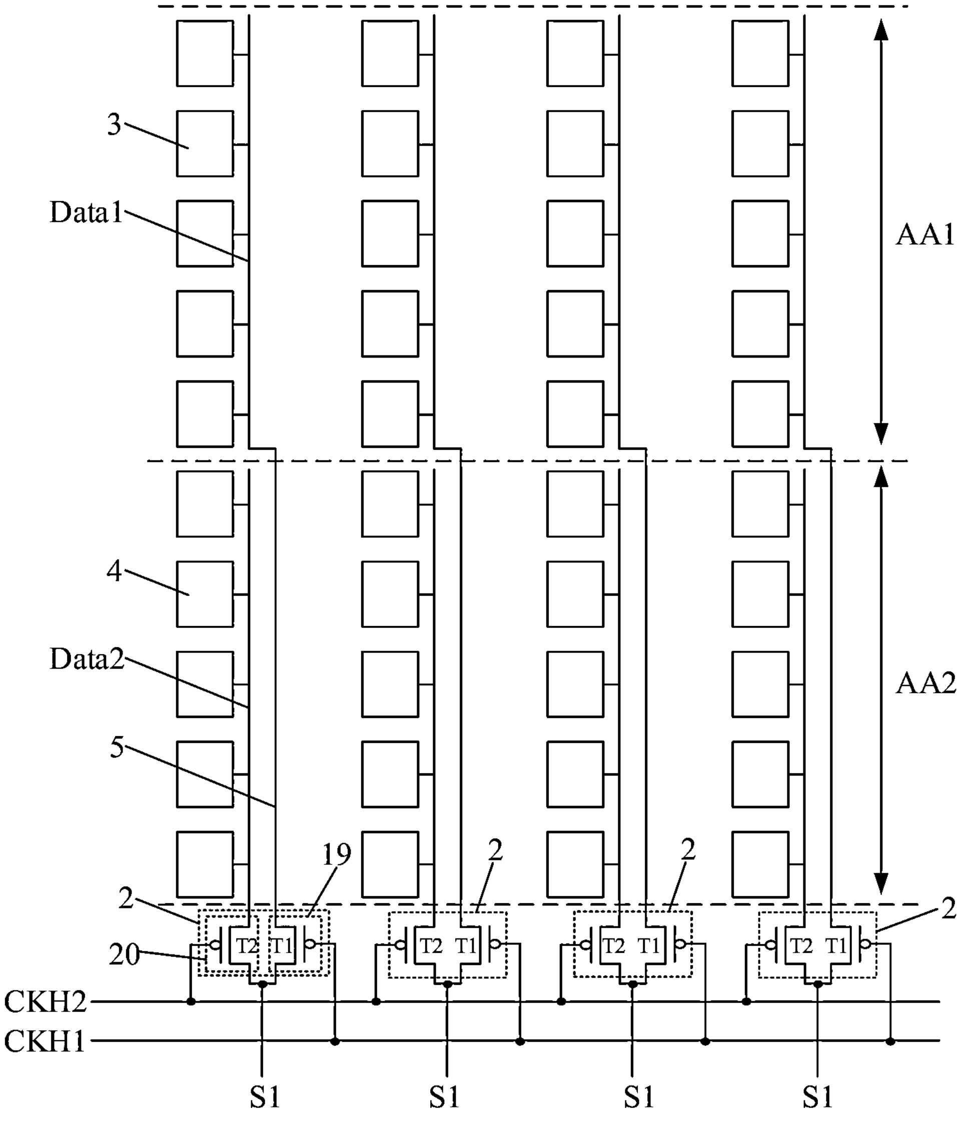
FIG. 18 is a schematic diagram of a control circuit according to some embodiments of the present disclosure.
Figure 19:
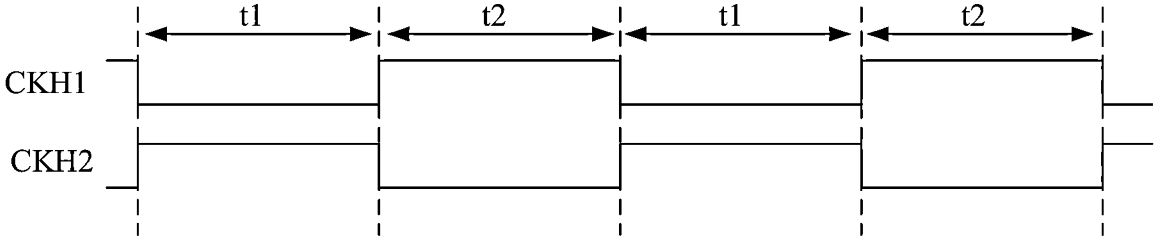
FIG. 19 is a timing diagram corresponding to FIG. 18 according to embodiments of the present disclosure.

FIG. 18 is a structural diagram of a control circuit 2 according to some embodiments of the present disclosure, and FIG. 19 is a timing diagram corresponding to FIG. 18. In some embodiments, as shown in FIG. 18 and FIG. 19, the control circuit 2 includes a first switch 19 and a second switch 20, an input terminal of the first switch 19 and an input terminal of the second switch 20 are electrically connected to a first source signal line S1, an output terminal of the first switch 19 is electrically connected to the first data line Data1, and an output terminal of the second switch 20 is electrically connected to the second data line Data2. The first switch 19 is turned on when the first sub-region AA1 is scanned, and the second switch 20 is turned on when the second sub-region AA2 is scanned.

In the timing diagram according to some embodiments of the present disclosure, a time period for scanning the first sub-region AA1 is represented by t1, and a time period for scanning the second sub-region AA2 is represented by t2.

In some embodiments, the first switch 19 includes a first transistor T1, and the second switch 20 includes a second transistor T2. A gate electrode of the first transistor T1 is electrically connected to a first clock signal line CKH1. A gate electrode of the second transistor T2 is electrically connected to a second clock signal line CKH2. A first electrode of the first transistor T1 and a first electrode of the second transistor T2 are electrically connected to a first source signal line S1. A second electrode of the first transistor T1 is electrically connected to the first data line Data1, e.g., through the connection line 5. The second electrode of the second transistor T2 is electrically connected to the second data line Data2.

During the scanning of the first sub-region AA1, the first clock signal line CKH1 provides an enabling level for turning on the first transistor T1, and the voltage provided by the first source signal line S1 is transmitted to the first data line Data1 through the first transistor T1, so as to control the display of the first sub-region AA1. During the scanning of the second sub-region AA2, the second clock signal line CKH2 provides an enabling level for turning on the second transistor T2, and the voltage provided by the first source signal line S1 is transmitted to the second data line Data2 through the second transistor T2, so as to control the display of the second sub-region AA2. In this way, the first data line Data1 and the second data line Data2 receive voltages in a time division manner.

Figure 20:
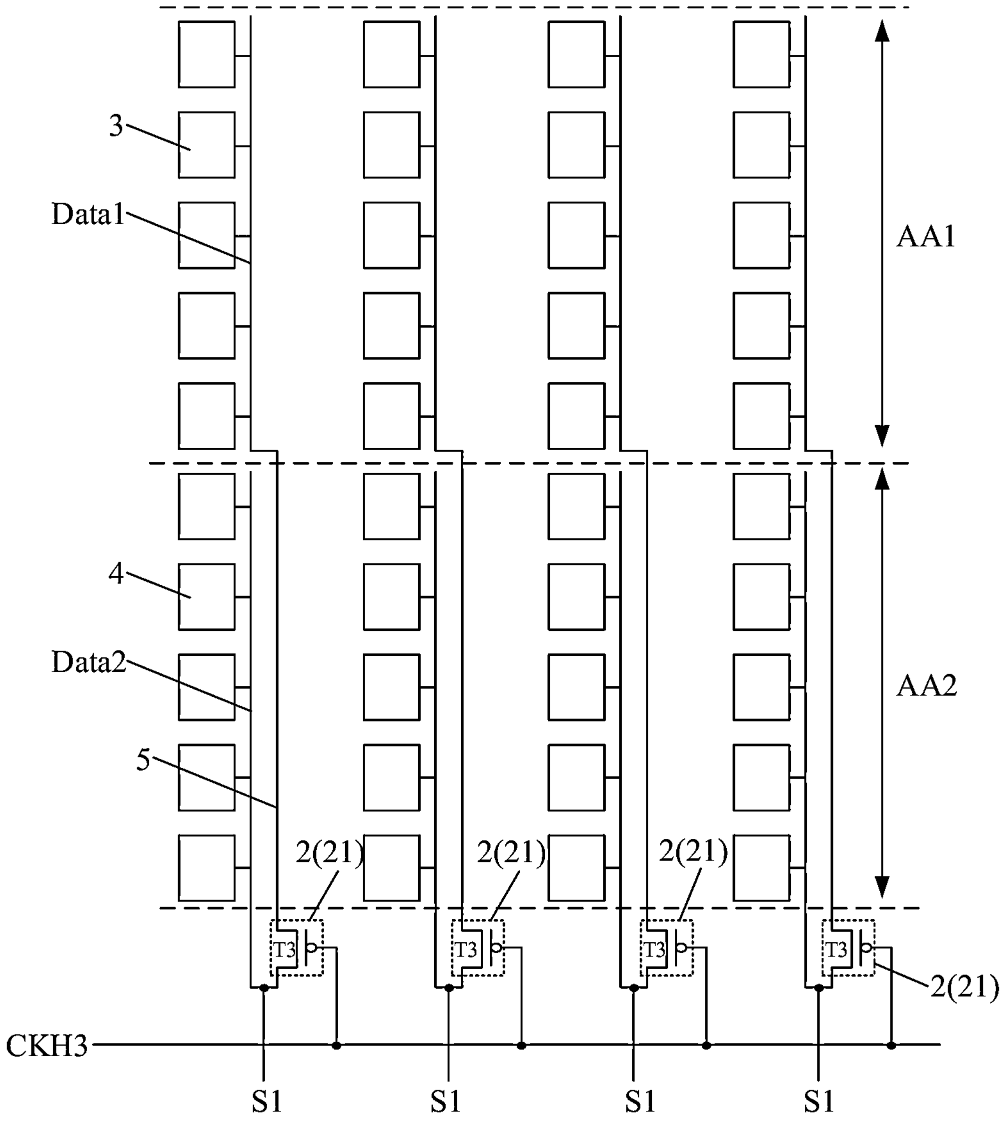
FIG. 20 is a schematic diagram of a control circuit according to some embodiments of the present disclosure.
Figure 21:
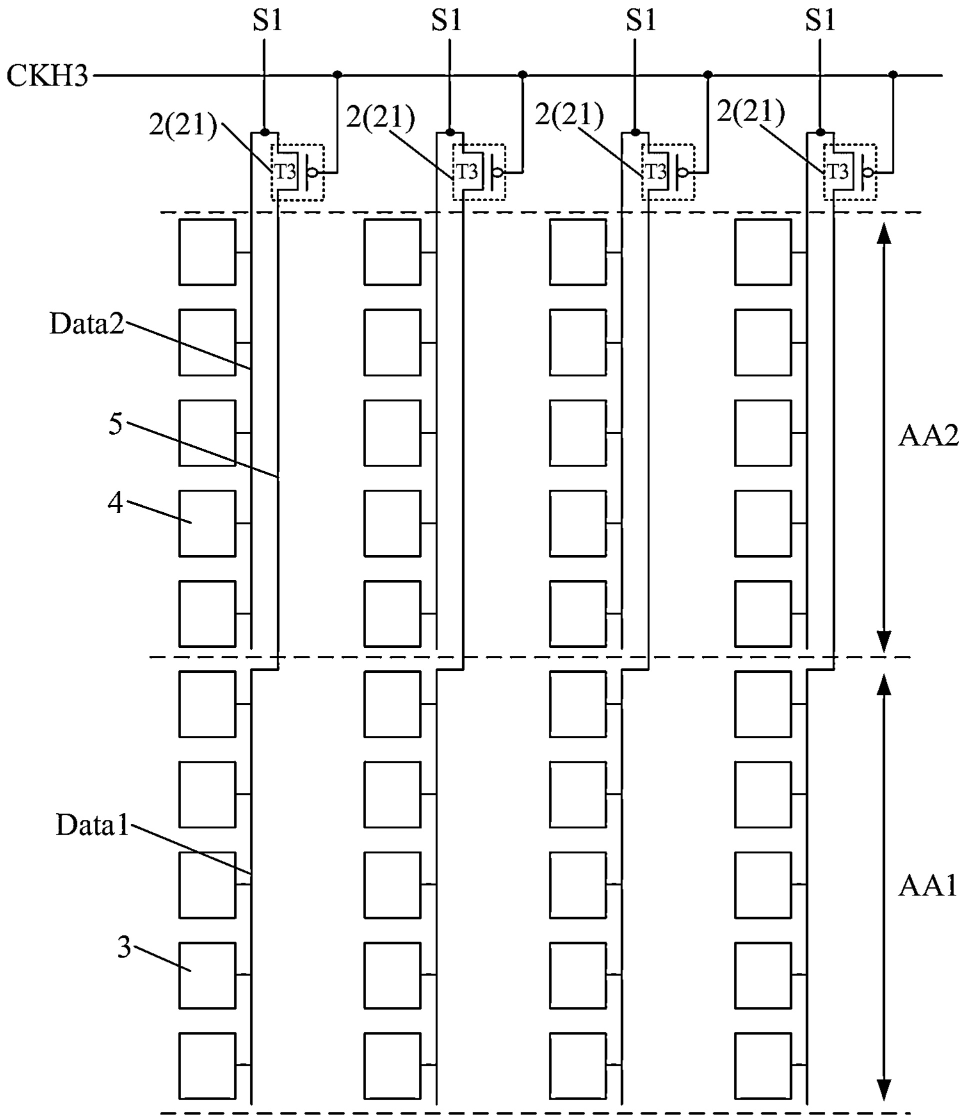
FIG. 21 is a schematic diagram of a control circuit according to some embodiments of the present disclosure.
Figure 22:
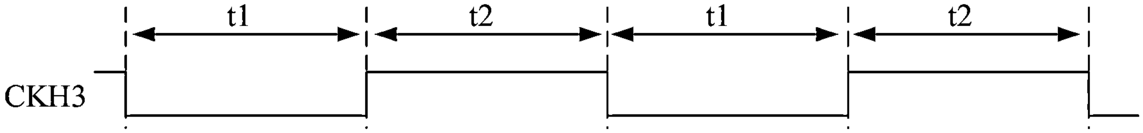
FIG. 22 is a timing diagram corresponding to FIG. 20 and FIG. 21 according to embodiments of the present disclosure.

FIG. 20 is a structural diagram of a control circuit according to some embodiments of the present disclosure, FIG. 21 is a structural diagram of a control circuit according to some embodiments of the present disclosure, and FIG. 22 is a timing diagram corresponding to FIG. 20 and FIG. 21. In another embodiment, as shown in FIG. 20 to FIG. 22, the control circuit 2 includes a third switch 21. The second data line Data2 and an input terminal of the third switch 21 are electrically connected to the first source signal line S1, and the output terminal of the third switch 21 is electrically connected to the first data line Data1. The third switch 21 is turned on when the first sub-region AA1 is scanned, and the second frequency is greater than the first frequency.

In one or more embodiments, the third switch 21 includes a third transistor T3. A gate electrode of the third transistor T3 is electrically connected to a third clock signal line CKH3. The second data line Data2 and a first electrode of the third transistor T3 are both electrically connected to the first source signal line S1, and a second electrode of the third transistor T3 is electrically connected to the first data line Data1, e.g. through a connection line 5.

During the scanning of the first sub-region AA1, the third clock signal line CKH3 provides an enable level to turn on the third transistor T3, and the voltage provided by the first source signal line S1 is transmitted to the first data line Data1 through the third transistor T3, controlling the display of the first sub-region AA1. During the scanning of the second sub-region AA2, the data voltage on the second data line Data2 is transmitted to the second pixel circuit 4, controlling the display of the second sub-region AA2.

It should be noted that since the second data line Data2 is directly connected to the third transistor T3, when the first sub-region AA1 is scanned, the voltage provided by the first source signal line S1 will also be transmitted on the second data line Data2. However, since the second sub-region AA2 is not being scanned at this time, the voltage on the second data line Data2 is not input to the second pixel circuit 4, so that the normal display of the second sub-region AA2 is not affected.

In such configuration, since the first source data line Data1 is directly connected to the second data line Data2, whether scanning the first sub-region AA1 or the second sub-region AA2, the voltage on the first source data line Data will be transmitted to the second sub-region AA2. To this end, the present disclosure can further design the second sub-region AA2 as a high-frequency sub-region, which can avoid flickering of the second sub-region AA2 due to the influence of the high-frequency voltage jump on the second data line Data2.

In addition, based on the above structure, referring to FIG. 20 and FIG. 21, the control circuit 2 can set in an upper frame or a lower frame, which can be adjusted according to the design requirements of different border widths.

Figure 23:
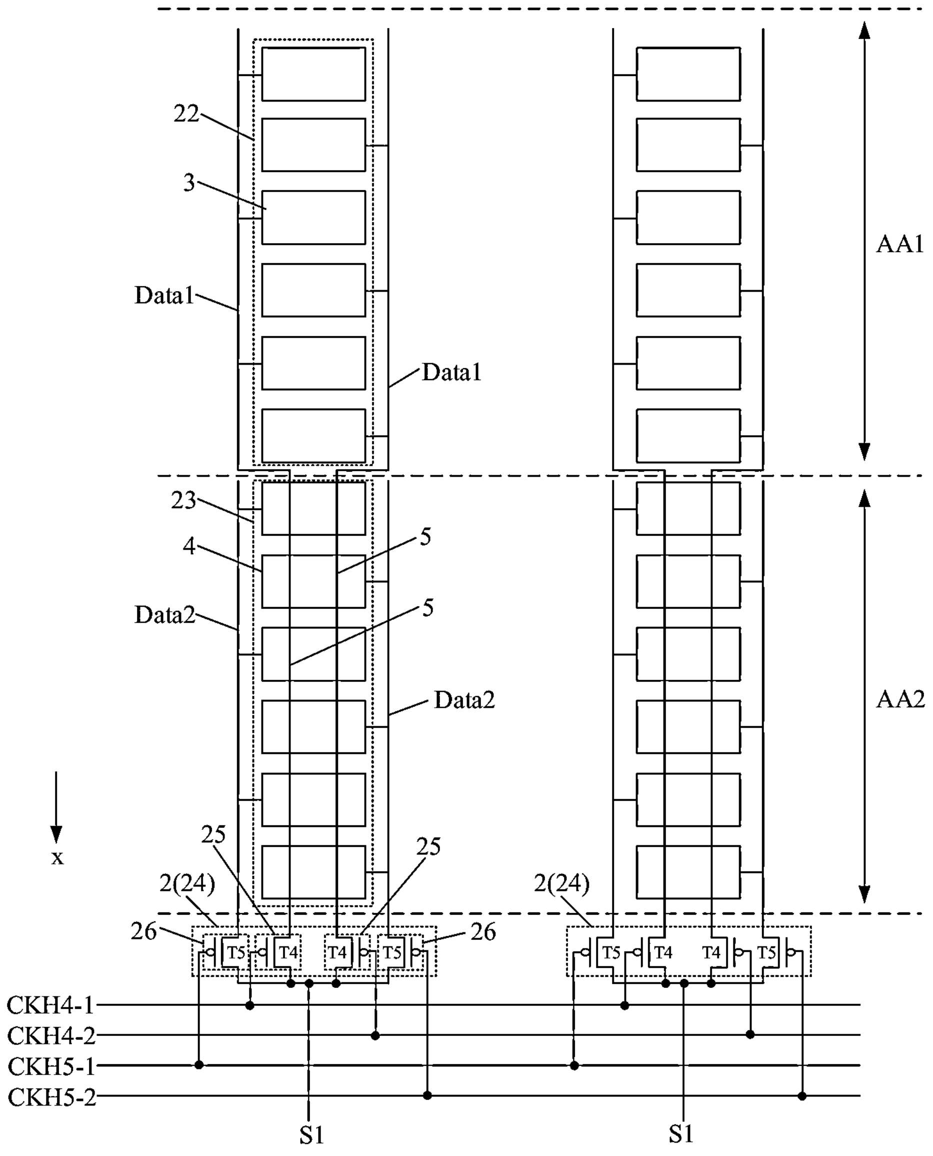
FIG. 23 is a schematic diagram of a control circuit according to some embodiments of the present disclosure.
Figure 24:
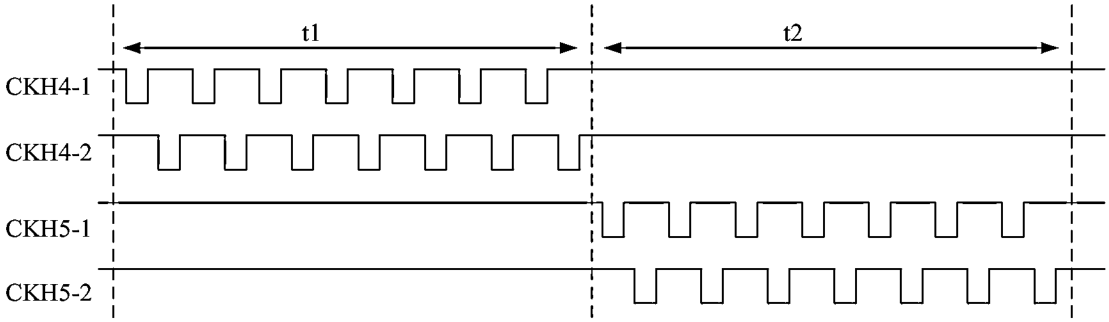
FIG. 24 is a timing diagram corresponding to FIG. 23 according to embodiments of the present disclosure.

FIG. 23 is a structural diagram of a control circuit according to some embodiments of the present disclosure, and FIG. 24 is a timing diagram corresponding to FIG. 23. Alternatively, in some embodiments, as shown in FIG. 23 and FIG. 24, the display panel includes a first circuit group 22 in the first sub-region AA1 and a second circuit group 23 in the second sub-region AA2. The first circuit group 22 includes multiple first pixel circuits arranged in a first direction x. The second circuit group 23 includes multiple second pixel circuits 4 arranged in the first direction x. The first direction x is an arrangement direction of the first sub-region AA1 and the second sub-region AA2. That is, the first pixel circuits are arranged in first circuit groups 22, and the second pixel circuits 4 are arranged in second circuit groups 23. Each first circuit group 22 includes multiple first pixel circuits, and each second circuit group 23 includes multiple second pixel circuits 4.

One first circuit group 22 is electrically connected to two first data lines Data1, and one second circuit group 23 is electrically connected to two second data lines Data2. In the first circuit group 22, odd-numbered first pixel circuits 3 are electrically connected to one first data line Data1, and even-numbered first pixel circuits 3 are electrically connected to the other first data line Data1. In the second circuit group 23, odd-numbered second pixel circuits 4 are electrically connected to one second data line Data2, and even-numbered second pixel circuits 4 are electrically connected to the other second data line Data2. In this way, the charging time of the pixel circuit 1 is increased by such two data lines Data, thereby optimizing the display effect.

The control circuits 2 include at least one switch group 24. One switch group 24 corresponds to one first circuit group 22 and one second circuit group 23. The first circuit group 22 and the second circuit group 23 that correspond to the switch group 24 are arranged in a first direction x. The switch group 24 includes two fourth switches 25 and two fifth switches 26. The input terminals of the two fourth switches 25 and the input terminals of the two fifth switches 26 are electrically connected to the first source signal line S1. The output terminals of two fourth switches 25 are, respectively, electrically connected to two first data lines Data1 that are connected to the corresponding first circuit group 22. The output terminals of the two fifth switches 26 are, respectively, electrically connected to two second data lines Data2 that are connected to the corresponding second circuit group 23. At least two fourth switches 25 in the control circuits 2 are turned on one by one when the first sub-region AA1 is scanned, and at least two fifth switches 26 in the control circuits 2 are turned on one by one when the second sub-region AA2 is scanned.

In one or more embodiments, the fourth switch 25 includes a fourth transistor T4, and the fifth switch 26 includes a fifth transistor T5. The gate electrodes of the two fourth transistors T4 are electrically connected to two fourth clock signal lines CKH4 respectively, and the gate electrodes of the two fifth transistors T5 are electrically connected to two fifth clock signal lines CKH5. For clarity, as shown in FIG. 23 and FIG. 24, two fourth clock signal lines are denoted by reference signs CKH4-1 and CKH4-2, respectively, and two fifth clock signal lines are denoted by reference signs CKH5-1 and CKH5-2, respectively. The first electrodes of two fourth transistors T4 and the first electrodes of two fifth transistors T5 are electrically connected to the first source signal line S1. The second electrodes of the two fourth transistors T4 are, respectively, electrically connected to two first data lines Data1 connected to the first circuit group 22 including the two fourth transistors T4. The second electrodes of the two fifth transistors T5 are, respectively, electrically connected to two second data lines Data2 connected to the second circuit group 23 including the two fifth transistors T5.

As an example, the control circuit 2 includes one switch group 24. When the first sub-region AA1 is scanned, the fourth clock signal line CKH4-1 and the fourth clock signal line CKH4-2 provide an enable signal in a time division manner, and the voltages provided by the first source signal line S1 are respectively input into the first pixel circuit 3 in the odd-numbered row and the first pixel circuit 3 in the even-numbered row, achieving the display of the first sub-region AA1. When the second sub-region AA2 is scanned, the fifth clock signal line CKH5-1 and the fifth clock signal line CKH5-2 provide an enable signal in a time division manner, the voltages provided by the first source signal line S1 are input into the second pixel circuit 4 in the odd-numbered row and the second pixel circuit 4 in the even-numbered row, achieving the display of the second sub-region AA2.

Figure 25:
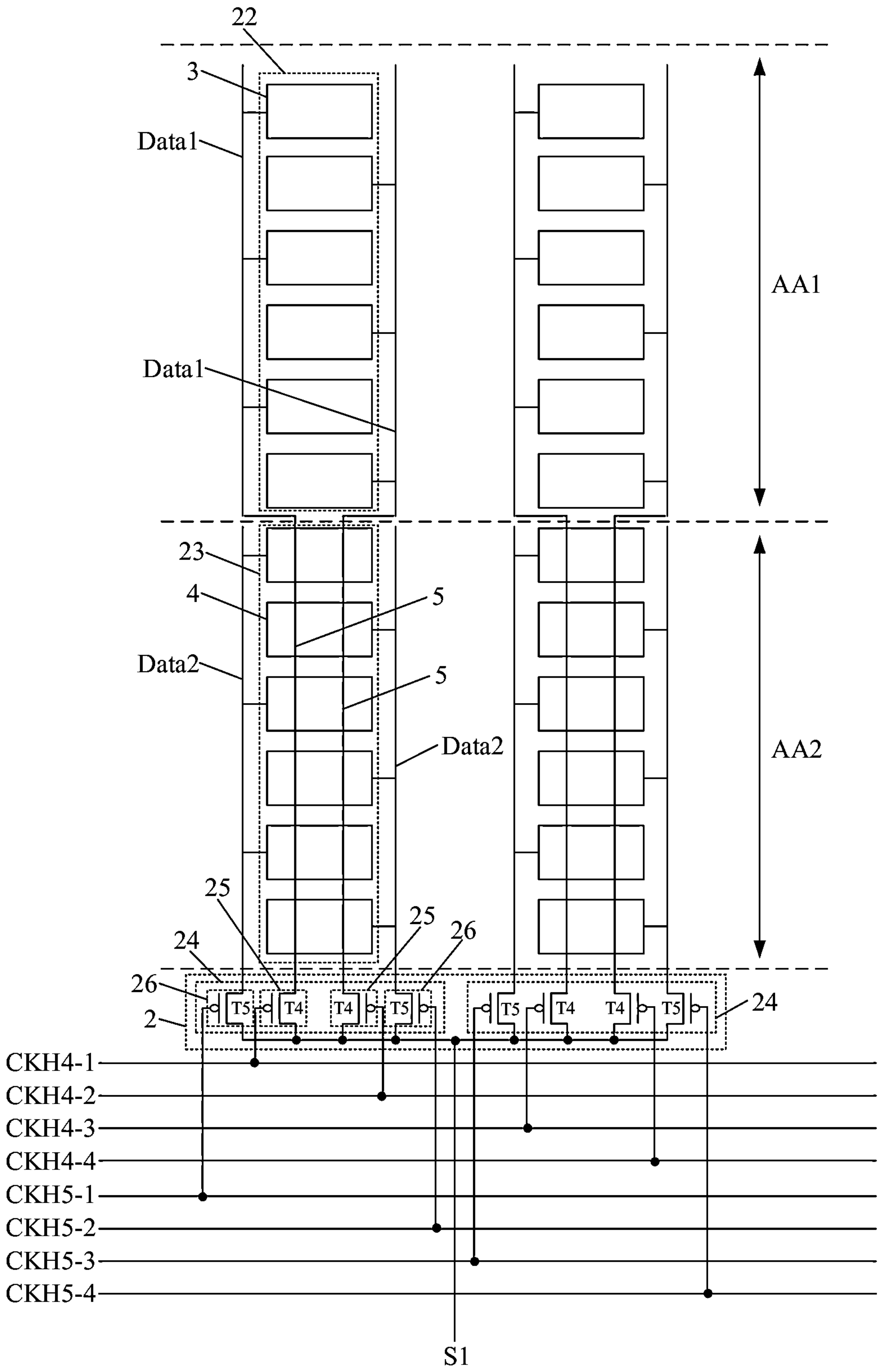
FIG. 25 is a schematic diagram of a control circuit according to some embodiments of the present disclosure.
Figure 26:
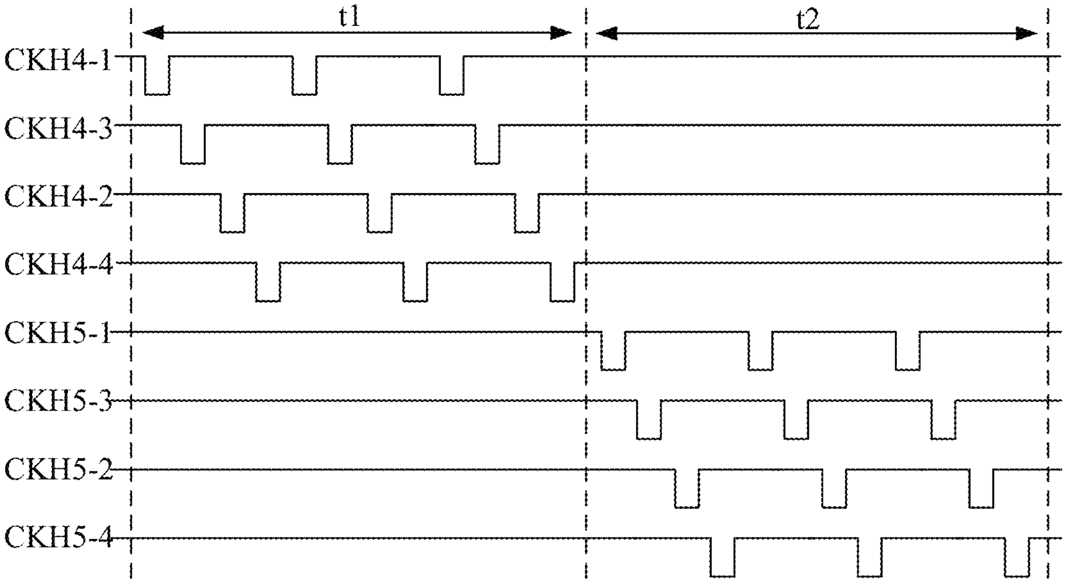
FIG. 26 is a timing diagram corresponding to FIG. 25 according to embodiments of the present disclosure.

FIG. 25 is a structural diagram of a control circuit according to some embodiments of the present disclosure, and FIG. 26 is a timing diagram corresponding to FIG. 25. Further, as shown in FIG. 25 and FIG. 26, the control circuit 2 includes at least two switch groups 24, input terminals of the fourth switches 25 and input terminals of the fifth switches 26 in the at least two switch groups 24 are all electrically connected to the first source signal line S1.

As an example, the control circuit 2 includes n switch groups 24. In one or more embodiments, the gate electrodes of the 2n fourth transistors T4 in the control circuit 2 are electrically connected to 2n fourth clock signal lines CKH4, and the gate electrodes of the 2n fifth transistors T5 in the control circuit 2 are electrically connected to 2n fifth clock signal lines CKH5. For clarity, as shown in FIG. 25 and FIG. 26, the 2n fourth clock signal lines are denoted by reference signs CKH4-1 to CKH4-2$n$, respectively, and the 2n fifth clock signal lines are denoted by reference signs CKH5-1 to CKH5-2$n$, respectively. The first electrodes of the 2n fourth transistors T4 and the first electrodes of the 2n fifth transistors T5 are electrically connected to the first source signal line S1. The second electrodes of the 2n fourth transistors T4 are, respectively, electrically connected to 2n first data lines Data1 corresponding to n first circuit groups 22 of the n switch groups 24. The second electrodes of the 2n fifth transistors T5 are, respectively, electrically connected to 2n second data lines Data2 corresponding to n second circuit groups 23 of the n switch groups 24.

As an example, the control circuit 2 includes two switch groups 24. When the first sub-region AA1 is scanned, a fourth clock signal line CKH4-1, a fourth clock signal line CKH4-3, a fourth clock signal line CKH4-2, and a fourth clock signal line CKH4-4 provide an enable signal in a time division manner, for example, provide the enable signal one by one. The voltage provided by the first source signal line S1 is input into the first pixel circuit 3 in the odd-numbered row and the first pixel circuit 3 in the even-numbered row, achieving the display of the first sub-region AA1. When the second sub-region AA2 is scanned, a fifth clock signal line CKH5-1, a fifth clock signal line CKH5-3, a fifth clock signal line CKH5-2, and a fifth clock signal line CKH5-4 provide an enable signal in a time division manner, for example, provide the enable signal one by one. The voltage provided by the first source signal line S1 is input into the second pixel circuit 4 in the odd-numbered row and the second pixel circuit 4 in the even-numbered row, achieving the display of the second sub-region AA2.

When the control circuit 2 includes at least two switch groups 24, the at least two switch groups 24 are electrically connected to only one first source signal line S1. Compared with the control circuit 2 that only includes one switch group 24, it greatly reduces the number of the first source signal line S1.

Figure 27:
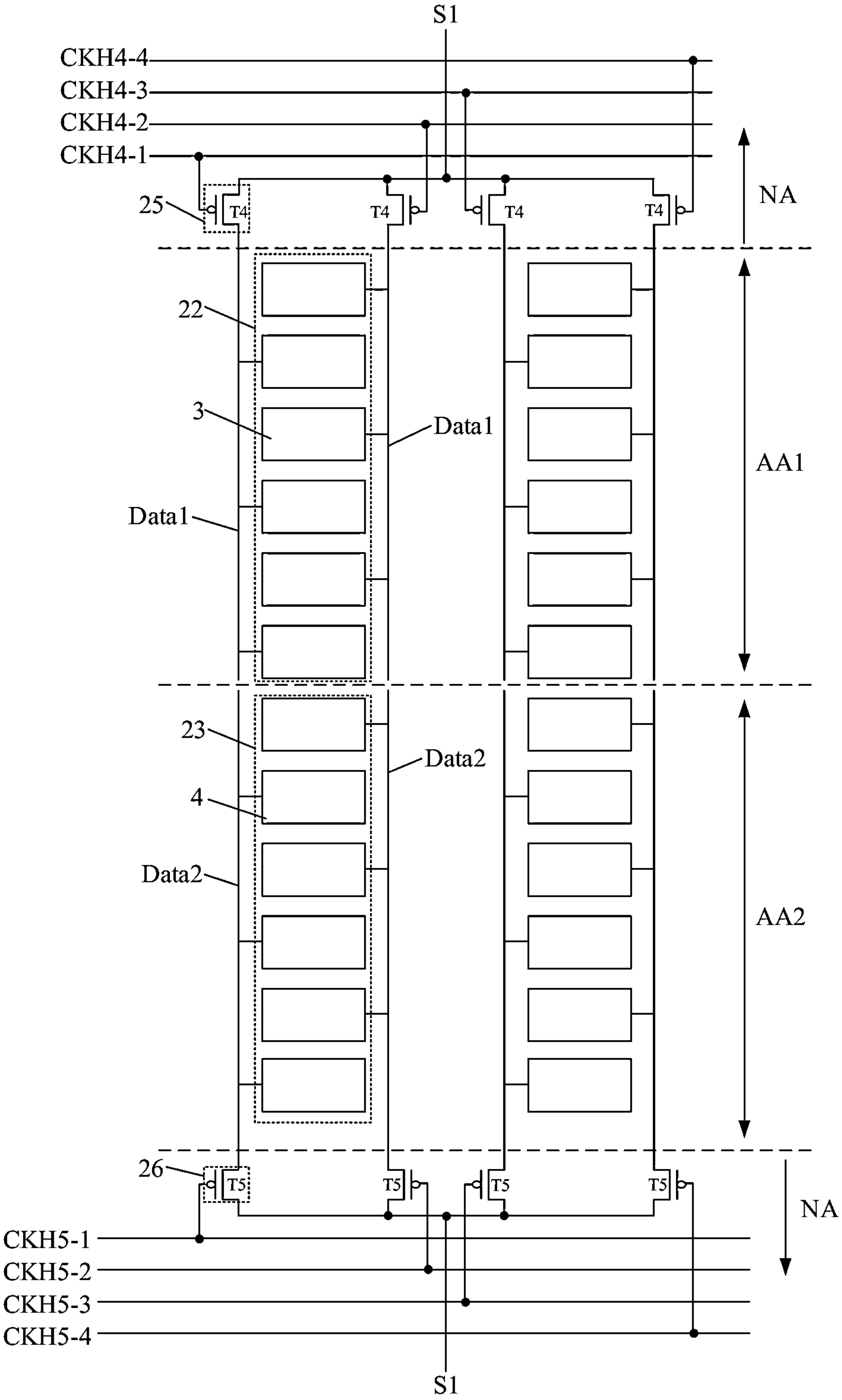
FIG. 27 is a schematic diagram of a control circuit according to some embodiments of the present disclosure.

FIG. 27 is a structural diagram of a control circuit 2 according to some embodiments of the present disclosure. Further, as shown in FIG. 27, the fourth switch 25 is located on a side of the non-display region NA adjacent to the first sub-region AA1, and the fifth switch 26 is located on a side of the non-display region NA adjacent to the second sub-region AA2.

With such configuration, on the one hand, the switches in the control circuit 2 are arranged in the upper frame and the lower frame, which helps a narrow bezel design of the display panel. On the other hand, the fourth switch 25 is located on a side of the non-display region NA adjacent to the first sub-region AA1, and therefore, the fourth switch 25 can be directly connected to the first data line Data1. Accordingly, there is no need to provide the connection line 5 in the display panel for connecting the control circuit 2 and the first data line Data1, so that the number of wirings is reduced, thereby reducing the design difficulty.

Figure 28:
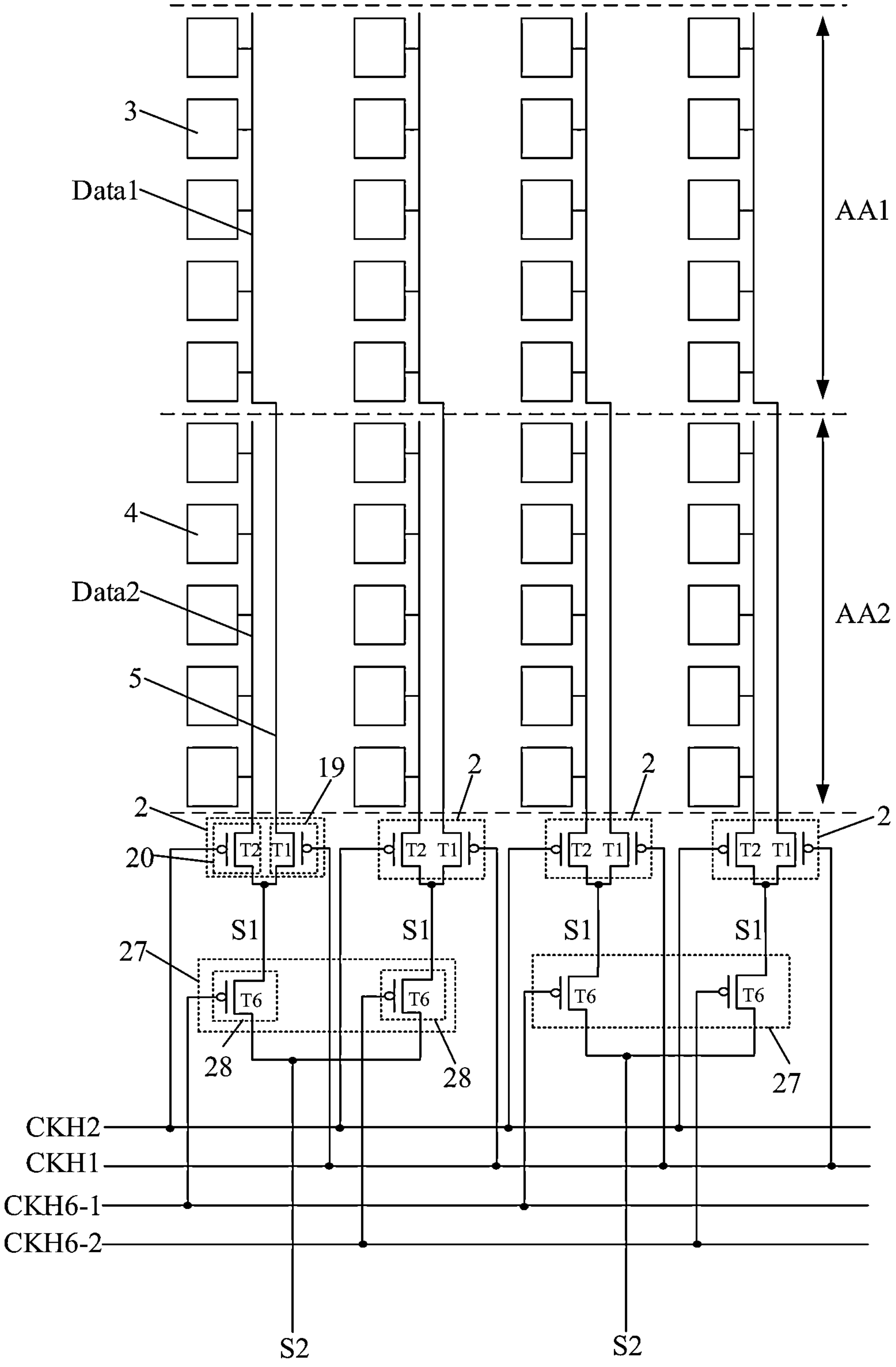
FIG. 28 is a schematic diagram of a gating circuit according to some embodiments of the present disclosure.
Figure 29:
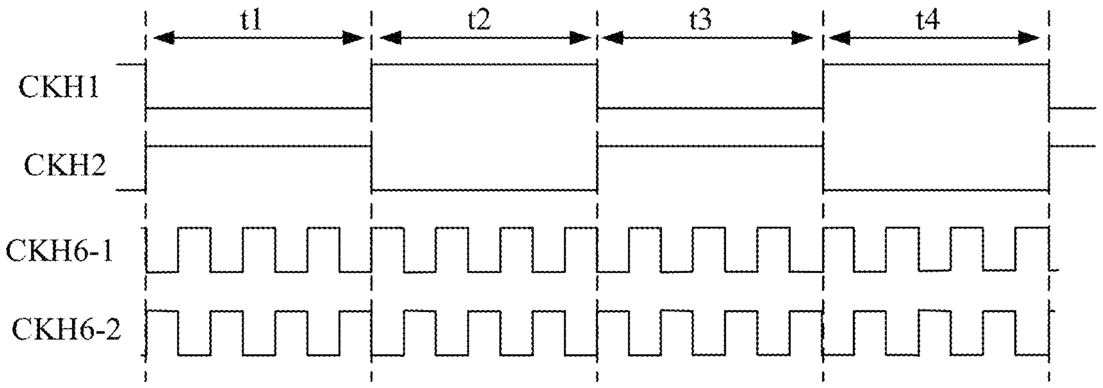
FIG. 29 is a timing diagram corresponding to FIG. 28 according to embodiments of the present disclosure.

FIG. 28 is a structural diagram of a gating circuit 27 according to some embodiments of the present disclosure, and FIG. 29 is a timing diagram corresponding to FIG. 28. In some embodiments, as shown in FIG. 28 and FIG. 29, the display panel further includes multiple gating circuits 27 electrically connected to at least two control circuits 2. The gating circuit 27 is configured to transmit a voltage to at least two control circuits 2 connected thereto in a time division manner.

The gating circuit 27 includes at least two gating switches 28. Input terminals of the at least two gating switches 28 are all electrically connected to a second source signal line S2. Output terminals of the at least two gating switches 28 are electrically connected to at least two first source signal lines S1. Further, the gating switch 28 may include a gating transistor T6. Gate electrodes of at least two gating transistors T6 are electrically connected to at least two sixth clock signal lines CKH6 respectively. For clarity, as shown in FIG. 28 and FIG. 29, the at least two sixth clock signal lines are denoted by reference signs CKH6-1 to CKH6-2, respectively. First electrodes of at least two gating transistors T6 are electrically connected to the second source signal line S2, and second electrodes of at least two gating transistors T6 are electrically connected to at least two first source signal lines S1, respectively.

For example, the control circuit 2 includes a first transistor T1 and a second transistor T2, and the gating circuit 27 includes two gating transistors T6. Referring to FIG. 29, when the first sub-region AA1 is scanned, a sixth clock signal line CKH6-1 and a sixth clock signal line CKH6-2 provide an enable level in a time division manner, and two gating transistors T6 in the gating circuit 27 are turned on in a time division manner. When the gating transistor T6 corresponding to the sixth clock signal line CKH6-1 is turned on, the voltage provided by the second source signal line S2 is transmitted to the first source signal line S1 connected to the gating transistor T6, and is further transmitted to the first data line Data1 through the turned-on first transistor T1. When the gating transistor T6 corresponding to the sixth clock signal line CKH6-2 is turned on, the voltage provided by the second source signal line S2 is transmitted to the first source signal line S1 connected to the gating transistor T6, and is further transmitted to the first data line Data1 through the turned-on first transistor T1. When the second sub-region AA2 is scanned, a sixth clock signal line CKH6-1 and a sixth clock signal line CKH6-2 provides an enable level in a time division manner, and at least two gating transistors T6 in the gating circuit 27 are turned on in a time division manner. When the gating transistor T6 corresponding to the sixth clock signal line CKH6-1 is turned on, the voltage provided by the second source signal line S2 is transmitted to the first source signal line S1 connected to the gating transistor T6, and is further transmitted to the second data line Data2 through the turned-on second transistor T2. When the gating transistor T6 corresponding to the sixth clock signal line CKH6-2 is turned on, the voltage provided by the second source signal line S2 is transmitted to the first source signal line S1 connected to the gating transistor T6, and is further transmitted to the second data line Data2 through the turned-on second transistor T2.

In some embodiments, combined with FIG. 3 and FIG. 4, the pixel circuit 1 includes a driving transistor M0 and a data writing transistor M2, and the data writing transistor M2 is electrically connected to both the first scan signal line Scan1 and the first electrode of the driving transistor M0. The data writing transistor M2 in the first pixel circuit 3 is further electrically connected to the first data line Data1, and the data writing transistor M2 in the second pixel circuit 4 is further electrically connected to the second data line Data2.

The second frequency is greater than the first frequency. In the first mode, the first scan signal line Scan1 scans the first sub-region AA1 and the second sub-region AA2 at the second frequency. It should be noted that in such configuration, although the first scan signal line Scan1 scans both the first sub-region AA1 and the second sub-region AA2 at the second frequency, the data voltage is input to the first pixel circuit 3 in the first sub-region AA1 still at the first frequency, that is, a refresh frequency for the data voltage of the first sub-region AA1 is still the first frequency.

Figure 30:
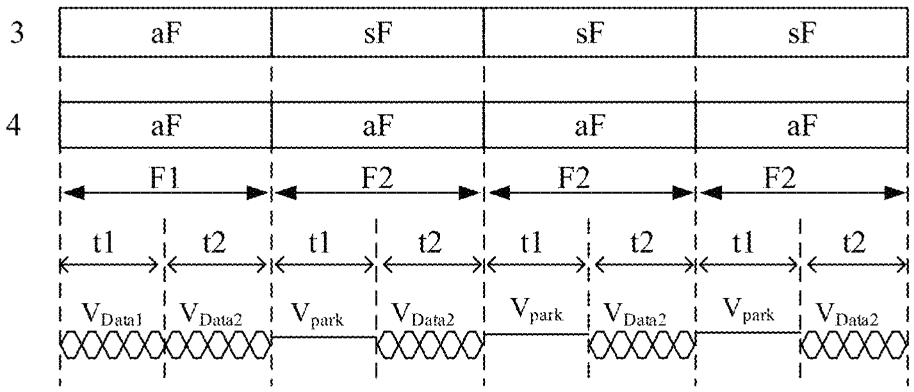
FIG. 30 is a timing diagram of signals provided by a control circuit according to some embodiments of the present disclosure.

FIG. 30 is a timing diagram of signals provided by a control circuit 2 according to some embodiments of the present disclosure. As shown in FIG. 30, in the first mode, a driving process of the first pixel circuit 3 includes a refreshing phase aF and a holding phase sF, and a driving process of the second pixel circuit 4 includes at least a refreshing phase aF. A driving process of the display panel includes a first frame F1 and a second frame F2. In the first frame F1, the first pixel circuit 3 and the second pixel circuit 4 are in their refreshing phases aF. In the second frame F2, the first pixel circuit 3 is in the holding phase sF, and the second pixel circuit 4 is in the refreshing phase aF.

In the first frame F1, the control circuit 2 writes a first data voltage $V_{Data1}$ to the first data line Data1 when the first scan signal line Scan scans the first sub-region AA1, and the control circuit 2 writes a second data voltage $V_{Data2}$ to the second data line Data2 when the first scan signal line Scan scans the second sub-region AA2. In the second frame F2, the control circuit 2 writes a preset voltage $V_{PARK}$ to the first data line Data1 when the first scan signal line Scan scans the first sub-region AA1, and the control circuit 2 writes a second data voltage to the second data line Data2 when the first scan signal line Scan scans the second sub-region AA2.

It can be understood that the data voltage is input to the pixel circuit 1 only in the refreshing phase aF, and no data voltage is required during the holding phase sF.

When the first sub-region AA1 is driven at a low frequency, and the second sub-region AA2 is driven at a high frequency, in some frames, the phase of the first pixel circuit 3 in the first sub-region AA1 and the phase of the second pixel circuit 4 in the second sub-region AA2 may be the same or different.

In the first frame F1, the first pixel circuit 3 and the second pixel circuit 4 are all in the refreshing phase aF, and the first pixel circuit 3 and the second pixel circuit 4 both need to receive the data voltage. At this time, when the first scan signal lines Scan1 scan the first sub-region AA1, that is, the first sub-region AA1 is scanned through the first scan signal lines Scan1 line by line, the data writing transistor M2 in the first pixel circuit 3 is turned on, and the control circuit 2 writes the first data voltage $V_{Data1}$ into the first data line Data1, so that the first pixel circuit 3 receives the data voltage during the refreshing phase aF to achieve normal display. When the first scan signal line Scan1 scans the second sub-region AA2, that is, the second sub-region AA2 is scanned through the first scan signal lines Scan1 line by line, the data writing transistor M2 in the second pixel circuit 4 is turned on, and the control circuit 2 writes the second data voltage $V_{Data2}$ into the second data line Data2, so that the second pixel circuit 4 receives the data voltage during the refreshing phase aF to achieve normal display.

In the second frame F2, the first pixel circuit 3 is in the holding phase sF, the second pixel circuit 4 is in the refreshing phase aF, the first pixel circuit 3 does not receive any data voltage, and the second pixel circuit 4 receives a data voltage. At this time, when the first scan signal line Scan1 scans the first sub-region AA1, that is, the first sub-region AA1 is scanned through the first scan signal lines Scan1 line by line, the data writing transistor M2 in the first pixel circuit 3 is turned on, and the control circuit 2 can write a preset voltage $V_{PARK}$ to the first data line Data1, so that the bias state of the driving transistor M0 in the first pixel driving circuit 3 is adjusted by the preset voltage $V_{PARK}$ during the holding phase, to stabilize the performance of the driving transistor M0. In this way, firstly, it achieves the display consistency of the sub-pixels in the first sub-region AA1 during the refreshing phase aF and the holding phase sF; and secondly, it can weaken the influence of the image of the second sub-region AA2 on the image of the first sub-region AA1. When the first scan signal line Scan1 scans the second sub-region AA2, that is, the second sub-region AA2 is scanned through the first scan signal lines Scan1 line by line, the data writing transistor M2 in the second pixel circuit 4 is turned on, and the control circuit 2 writes the second data voltage $V_{Data2}$ into the second data line Data2, so that the second pixel circuit 4 receives the data voltage during the refreshing phase aF to achieve normal display.

Figure 31:
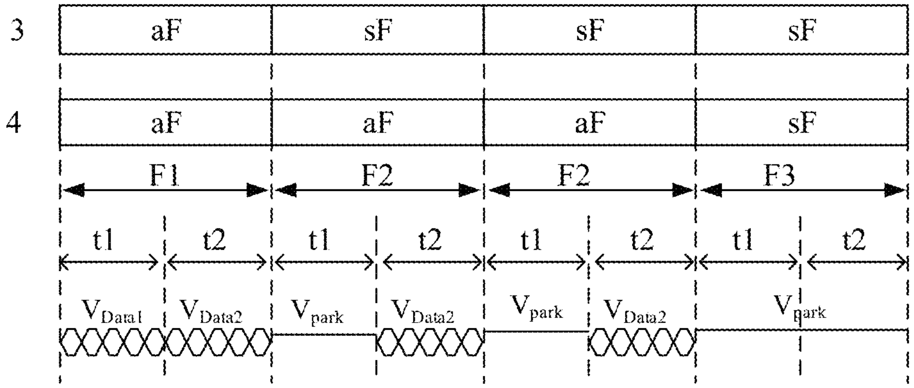
FIG. 31 is a timing diagram of signals provided by a control circuit according to some embodiments of the present disclosure.

FIG. 31 is a timing diagram of signals provided by a control circuit 2 according to some embodiments of the present disclosure. In some embodiments, as shown in FIG. 31, in the first mode, a driving process of the first pixel circuit 3 further includes a holding phase sF. In the first mode, a driving process of the display panel further includes a third frame F3. In the third frame F3, the first pixel circuit 3 and the second pixel circuit 4 are in the holding phase sF.

In the third frame F3, the control circuit 2 writes a preset voltage $V_{PARK}$ to the first data line Data1 when the first scan signal line Scan1 scans the first sub-region AA1, and the control circuit 2 writes a preset voltage $V_{PARK}$ to the second data line Data2 when the first scan signal line Scan1 scans the second sub-region AA2.

In the third frame F3, the first pixel circuit 3 and the second pixel circuit 4 are both in the holding phase sF. The first pixel circuit 3 and the second pixel circuit 4 do not receive any data voltage. At this time, when the first scan signal lines Scan1 scan the first sub-region AA1, that is, the first scan signal lines Scan1 scan the first sub-region AA1 line by line, the data writing transistor M2 in the first pixel circuit 3 is turned on, and the control circuit 2 can write a preset voltage $V_{PARK}$ to the first data line Data1, so that the first pixel circuit 3 receives the preset voltage $V_{PARK}$ during the holding phase sF and adjusts the bias state of the driving transistor M0 in the first pixel circuit 3. When the first scan signal lines Scan1 scan the second sub-region AA2, that is, the first scan signal lines Scan1 scan the second sub-region AA2 line by line, the data writing transistor M2 in the second pixel circuit 4 is turned on, and the control circuit 2 can write a preset voltage $V_{PARK}$ to the second data line Data2, so that the second pixel circuit 4 receives the preset voltage $V_{PARK}$ during the holding phase sF and adjusts the bias state of the driving transistor M0 in the second pixel circuit 4.

Figure 32:
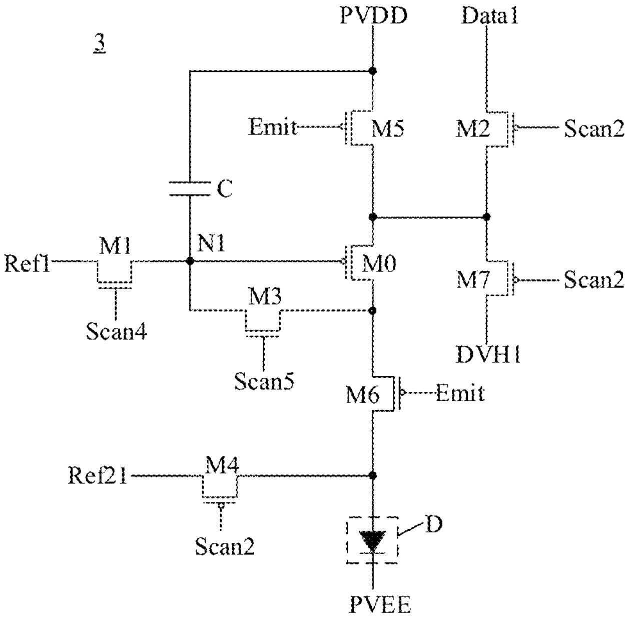
FIG. 32 is a schematic diagram of a first pixel circuit according to some embodiments of the present disclosure.
Figure 33:
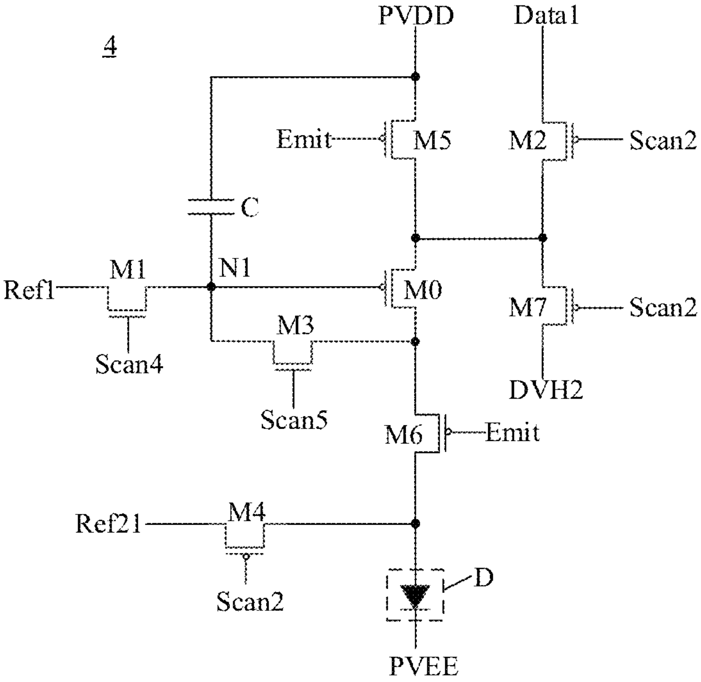
FIG. 33 is a schematic diagram of a second pixel circuit according to some embodiments of the present disclosure.
Figure 34:
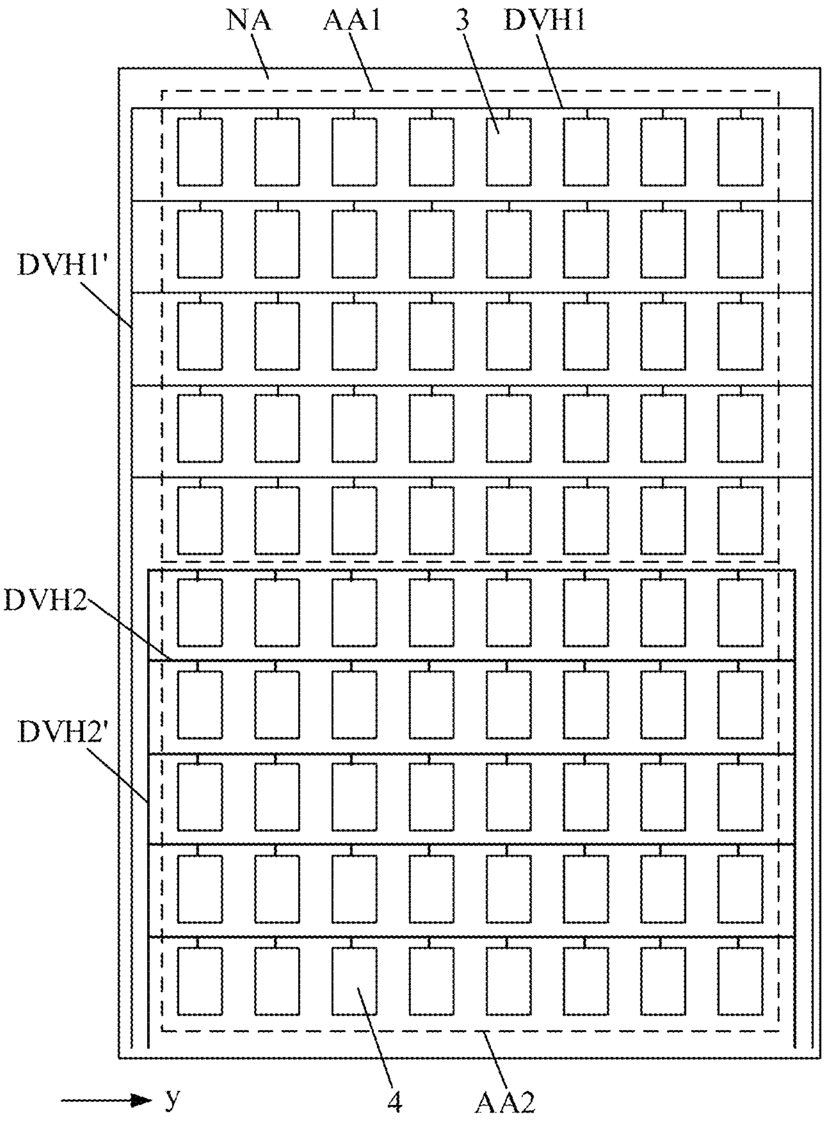
FIG. 34 is a top view of a display panel according to some embodiments of the present disclosure.
Figure 35:
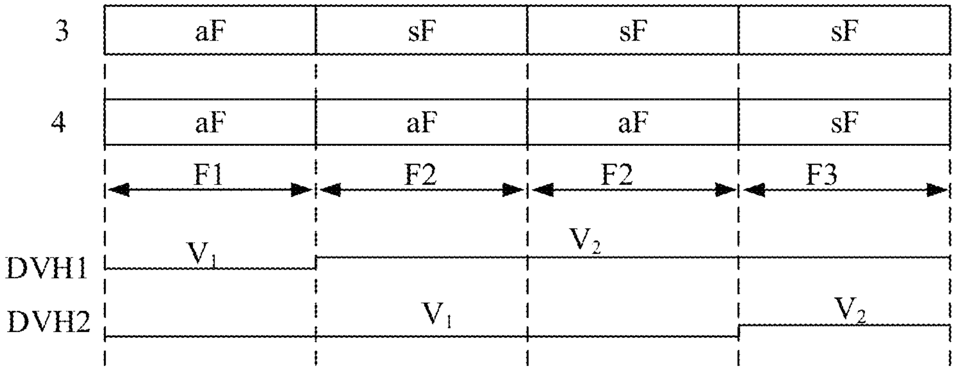
FIG. 35 is a timing diagram corresponding to FIG. 34 according to embodiments of the present disclosure.

FIG. 32 is a structural diagram of a first pixel circuit 3 according to some embodiments of the present disclosure, FIG. 33 is a structural diagram of a second pixel circuit 4 according to some embodiments of the present disclosure, FIG. 34 is a top view of a display panel according to some embodiments of the present disclosure, and FIG. 35 is a timing diagram corresponding to FIG. 34. In some embodiments, as shown in FIG. 32 to FIG. 34, the pixel circuit 1 includes a driving transistor M0 and a bias transistor M7. The bias transistor M7 is electrically connected to the second scan signal line Scan2 and a first electrode of the driving transistor M0, respectively. The bias transistor M7 in the first pixel circuit 3 is further electrically connected to a first bias signal line DVH1, and the bias transistor M7 in the second pixel circuit 4 is further electrically connected to the second bias signal line DVH2.

In a first mode, a driving process of the first pixel circuit 3 includes a refreshing phase aF and a holding phase sF, and a driving process of the second pixel circuit 4 includes a refreshing phase aF and a holding phase sF. In the first mode, the first bias signal line DVH1 provides different bias voltages in the refreshing phase aF and the holding phase sF of the first pixel circuit 3, and the second bias signal line DVH2 provides different bias voltages in the refreshing phase aF and the holding phase sF of the second pixel circuit 4. The bias voltage provided by the first bias signal line DVH1 during the refreshing phase aF of the first pixel circuit 3 can be the same as the bias voltage provided by the second bias signal line DVH2 during the refreshing phase aF of the second pixel circuit 4, as shown in FIG. 35, this bias voltage is denoted by $V_1$. The bias voltage provided by the first bias signal line DVH1 during the holding phase sF of the first pixel circuit 3 can be the same as the bias voltage provided by the second bias signal line DVH2 during the holding phase sF of the second pixel circuit 4, as shown in FIG. 35, this bias voltage is denoted by $V_2$.

The bias state of the driving transistor M0 in the pixel circuit 1 is adjusted using the bias transistor M7. The bias state of the driving transistor M0 can be adjusted by supplying bias voltages to the driving transistor M0 in the refreshing phase aF and the holding phase sF of the pixel circuit 1. However, the driving transistor M0 performs the operation of reset and data voltage writing during the refreshing phase aF, and does not perform the operation of reset and data voltage writing during the holding phase sF, so that there is a difference between the states of the driving transistor M0 during the refreshing phase aF and the holding phase sF. As a result, the bias voltages in the refreshing phase aF and the holding phase sF are different.

Combined with the above analysis, when the first sub-region AA1 and the second sub-region AA2 are driven by different frequencies, in some frames, the phase of the first pixel circuit 3 in the first sub-region AA1 and the phase of the second pixel circuit 4 in the second sub-region AA2 may be different. For example, in the second frame F2, the first pixel circuit 3 is in the holding phase sF, and the second pixel circuit 4 is in the refreshing phase aF. If the bias signal line is electrically connected to both the first pixel circuit 3 and the second pixel circuit 4, the bias signal line cannot supply different bias voltages to the first pixel circuit 3 and the second pixel circuit 4 in the same frame. In embodiments of the present disclosure, the first pixel circuit 3 and the second pixel circuit 4 are electrically connected to different bias signal lines, respectively, and the different bias signal lines are used to provide the bias voltages to the first pixel circuit 3 and the second pixel circuit 4, separately, so that the first pixel circuit 3 and the second pixel circuit 4 can receive different bias voltages in the same frame.

In some embodiments of the present disclosure, referring to FIG. 34, the first bias signal line DVH1 and the second bias signal line DVH2 can extend along the second direction y. Multiple first bias signal lines DVH1 are electrically connected to a pin through a first bias bus DVH1'. For example, the first bias signal lines DVH1 are electrically connected to two pins through two first bias buses DVH1'. First ends of the first bias signal lines DVH1 are electrically connected to one first bias bus DVH1', and second ends of the first bias signal lines DVH1 are electrically connected to the other first bias bus DVH1'. The first bias bus DVH1' may extend in the non-display region NA to the pin. In the same way, multiple second bias signal lines DVH2 are electrically connected to a pin through a second bias bus DVH2'. For example, second bias signal lines DVH2 are electrically connected to two pins through two second bias buses DVH2'. First ends of the second bias signal lines DVH2 are electrically connected to one second bias bus DVH2', and second ends of the second bias signal lines DVH2 are electrically connected to the other second bias bus DVH2'. The second bias bus DVH2' may extend in the non-display region NA to the pin.

Figure 36:
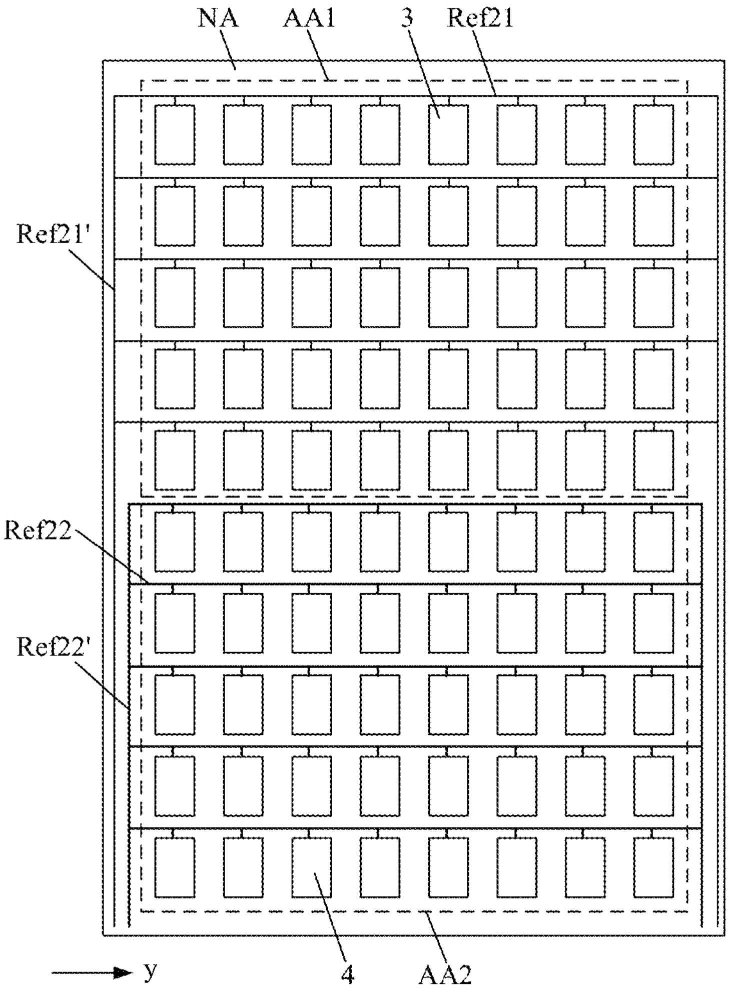
FIG. 36 is a top view of a display panel according to some embodiments of the present disclosure.
Figure 37:
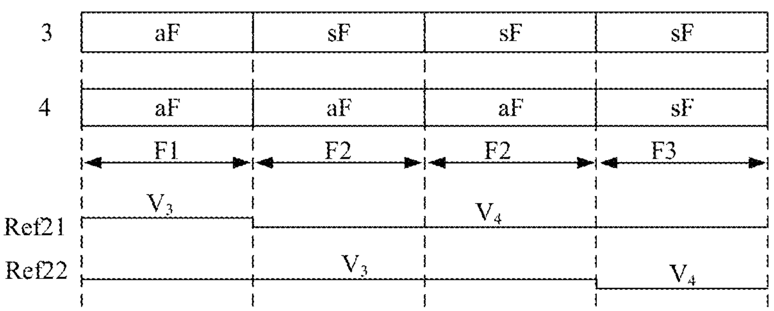
FIG. 37 is a timing diagram corresponding to FIG. 36 according to embodiments of the present disclosure.

FIG. 36 is a top view of a display panel according to some embodiments of the present disclosure, and FIG. 37 is a timing diagram corresponding to FIG. 36. In some embodiments, as shown in FIG. 32 to FIG. 33 and FIG. 36 to FIG. 37, the pixel circuit 1 includes an anode reset transistor M4. The anode reset transistor M4 is electrically connected to the second scan signal line Scan2 and the anode of the light-emitting element D, respectively. The anode reset transistor M4 in the first pixel circuit 3 is further electrically connected to a first anode reset signal line Ref21, and the anode reset transistor M4 in the second pixel circuit 4 is further electrically connected to a second anode reset signal line Ref22.

In the first mode, a driving process of the first pixel circuit 3 includes a refreshing phase aF and a holding phase sF, and a driving process of the second pixel circuit 4 includes a refreshing phase aF and a holding phase sF.

The first anode reset signal line Ref21 provides different anode reset voltages during the refreshing phase aF and the holding phase sF of the first pixel circuit 3. The second anode reset signal line Ref22 provides different anode reset voltages during the refreshing phase aF and the holding phase sF of the second pixel circuit 4. The anode reset voltage provided by the first anode reset signal line Ref21 in the refreshing phase aF of the first pixel circuit 3 can be the same as the anode reset voltage provided by the second anode reset signal line Ref22 in the refreshing phase aF of the second pixel circuit 4, and this anode reset voltage is shown by $V_3$ in FIG. 37. The anode reset voltage provided by the first anode reset signal line Ref21 in the holding phase sF of the first pixel circuit 3 can be the same as the anode reset voltage provided by the second anode reset signal line Ref22 in the holding phase sF of the second pixel circuit 4, and this anode reset voltage is shown by $V_4$ in FIG. 37.

In some embodiments, the anode reset voltage can be further used in the holding phase sF of the first pixel circuit 1 to adjust the anode potential of the light-emitting element, so that the light-emitting element has consistent brightness in the refreshing phase aF and the holding phase sF. Since the state of the driving transistor M0 is different in the holding phase sF and the refreshing phase aF, the anode reset voltage corresponding to the holding phase sF can be set low, and the brightness of the holding phase sF can be compensated to the same as that in the refreshing phase aF by combining with the driving current.

Similar to the above principle, in the design of the present disclosure, there is a second frame F2, that is, in the second frame F2, the first pixel circuit 3 is in the holding phase sF, and the second pixel circuit 4 is in the refreshing phase aF. To this end, in some embodiments of the present disclosure, the first pixel circuit 3 and the second pixel circuit 4 are connected to different anode reset signal lines, and the different anode reset signal lines provide signals to the first pixel circuit 3 and the second pixel circuit 4, respectively, so that the first pixel circuit 3 and the second pixel circuit 4 receive different anode reset voltages during the same one frame.

In some embodiments of the present disclosure, referring to FIG. 36, the first anode reset signal line Ref21 and the second anode reset signal line Ref22 can extend in a second direction y. Multiple first anode reset signal line Ref21 are electrically connected to a pins through a first anode reset bus Ref21'. Each of two ends of the first anode reset signal line Ref21 is connected to one first anode reset bus Ref21'. The first anode reset signal line Ref21 can extend in the non-display region NA to the pin. Similarly, multiple second anode reset signals Ref22 are electrically connected to a pin through a second anode reset bus Ref22'. Each of two ends of the second anode reset signal line Ref22 is connected to one second anode reset bus Ref22'. The second anode reset bus Ref22' can extend in the non-display region NA to the pin.

In some embodiments of the present disclosure, referring to FIG. 3, FIG. 4, FIG. 32 and FIG. 33, the pixel circuit 1 can further include a gate reset transistor M1, a first light-emitting control transistor M5, a second light-emitting control transistor M6 and a storage capacitor C.

As shown in FIG. 3 and FIG. 4, the gate electrode of the gate reset transistor M1 is electrically connected to the third scan signal line Scan3, and the first electrode of the gate reset transistor M1 is electrically connected to the gate reset signal line Ref1, and the second electrode of the gate reset transistor M1 is electrically connected to the gate electrode of the driving transistor M0.

The gate electrode of the data writing transistor M2 is electrically connected to the first scan signal line Scan1, and the second electrode of the data writing transistor M2 is electrically connected to the first electrode of the driving transistor M0. The first electrode of the data writing transistor M2 in the first pixel circuit 3 is electrically connected to the first data line Data1, and the first electrode of the data writing transistor M2 in the second pixel circuit 4 is electrically connected to the second data line Data2.

The gate electrode of the threshold compensation transistor M3 is electrically connected to the first scan signal line Scan1, the first electrode of the threshold compensation transistor M3 is electrically connected to the second electrode of the driving transistor M0, and the second electrode of the threshold compensation transistor M3 is electrically connected to the gate electrode of the driving transistor M0.

The gate electrode of the anode reset transistor M4 is electrically connected to the first scan signal line Scan1, and the first electrode of the anode reset transistor M4 is electrically connected to an anode reset signal line Ref2, and the second electrode of the anode reset transistor M4 is electrically connected to the anode of the light-emitting element D.

The gate electrode of the first light-emitting control transistor M5 is electrically connected to a light-emitting control signal line Emit, the first electrode of the first light-emitting control transistor M5 is electrically connected to a power supply line, and the second electrode of the first light-emitting control transistor M5 is electrically connected to the first electrode of the driving transistor M0.

The gate electrode of the second light-emitting control transistor M6 is electrically connected to the light-emitting control signal line Emit, the first electrode of the second light-emitting control transistor M6 is electrically connected to the second electrode of the driving transistor M6, and the second electrode of the second light-emitting control transistor M6 is electrically connected to the anode of the light-emitting element D.

The second plate of the storage capacitor C is electrically connected to the gate electrode of the driving transistor M0, and the first plate of the storage capacitor C is electrically connected to the power supply signal line PVDD. In some embodiments, the second plate of the storage capacitor C is reused as the gate electrode of the driving transistor M0.

As shown in FIG. 32 and FIG. 33, the gate electrode of the gate reset transistor M1 is electrically connected to a fourth scan signal line Scan4, the first electrode of the gate reset transistor M1 is electrically connected to the gate reset signal line Ref1, and the second electrode of the gate reset transistor M1 is electrically connected to the gate electrode of the driving transistor M0.

The gate electrode of the data writing transistor M2 is electrically connected to the first scan signal line Scan1, and the second electrode of the data writing transistor M2 is electrically connected to the first electrode of the driving transistor M0. The first electrode of the data writing transistor M2 in the first pixel circuit 3 is electrically connected to the first data line Data1, and the first electrode of the data writing transistor M2 in the second pixel circuit 4 is electrically connected to the second data line Data2.

The gate electrode of the threshold compensation transistor M3 is electrically connected to a fifth scan signal line Scan5, the first electrode of the threshold compensation transistor M3 is electrically connected to the second electrode of the driving transistor M0, and the second electrode of the threshold compensation transistor M3 is electrically connected to the gate electrode of the driving transistor M0.

The gate electrode of the anode reset transistor M4 is electrically connected to the second scan signal line Scan2, and the second electrode of the anode reset transistor M4 is electrically connected to the anode of the light-emitting element D. The first electrode of the anode reset transistor M4 in the first pixel circuit 3 is electrically connected to the first anode reset signal line Ref21, and the first electrode of the anode reset transistor M4 in the second pixel circuit 4 is electrically connected to the second anode reset signal line Ref22.

The gate electrode of the first light-emitting control transistor M5 is electrically connected to the light-emitting control signal line Emit, the first electrode of the first light-emitting control transistor M5 is electrically connected to the power supply line, and the second electrode of the first light-emitting control transistor M5 is electrically connected to the first electrode of the driving transistor M0.

The gate electrode of the second light-emitting control transistor M6 is electrically connected to the light-emitting control signal line Emit, the first electrode of the second light-emitting control transistor M6 is electrically connected to the second electrode of the driving transistor M0, and the second electrode of the second light-emitting control transistor M6 is electrically connected to the anode of the light-emitting element D.

The gate electrode of the bias transistor M7 is electrically connected to the second scan signal line Scan2, and the second electrode of the bias transistor M7 is electrically connected to the first electrode of the driving transistor M0. The first electrode of the bias transistor M7 in the first pixel circuit 3 is electrically connected to the first bias signal line DVH1, and the first electrode of the bias transistor M7 in the second pixel circuit 4 is electrically connected to the second bias signal line DVH2.

The second plate of the storage capacitor C is electrically connected to the gate electrode of the driving transistor M0, and the first plate of the storage capacitor C is electrically connected to the power supply signal line PVDD. In some embodiments, the second plate of the storage capacitor C is reused as the gate electrode of the driving transistor M0.

Figure 38:
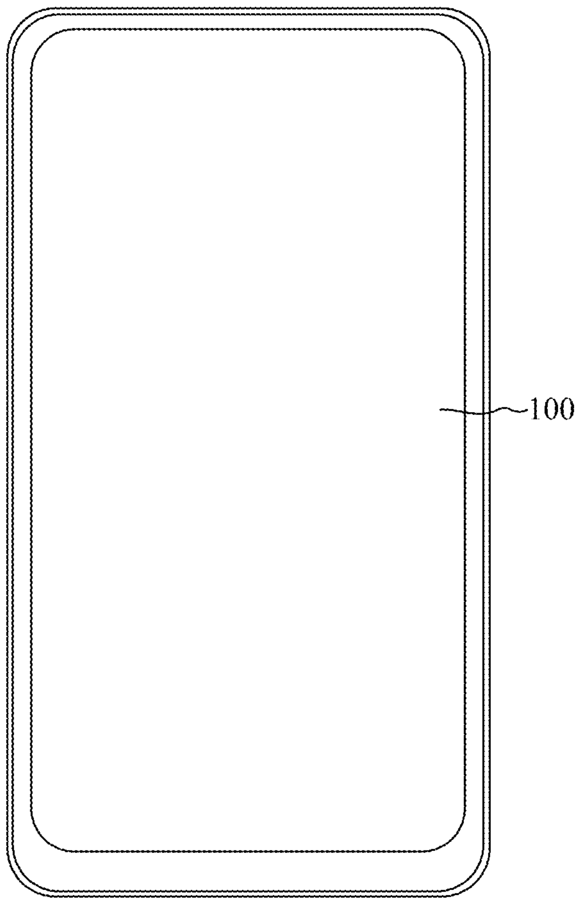
FIG. 38 is a structural diagram of a display apparatus according to some embodiments of the present disclosure.

An embodiment of the present disclosure also provides a display apparatus. FIG. 38 is a structural diagram of a display apparatus according to some embodiments of the present disclosure. As shown in FIG. 38, the display apparatus includes the display panel 100 describe above. The structure of the display panel has been described in the above embodiments which will not be elaborated here. The display apparatus shown in FIG. 38 is taken as an example. The display apparatus can be, for example, an electronic device such as a mobile phone, a tablet computer, a laptop computer, an e-paper book or a TV.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A display panel, comprising:
- a display region comprising:
  - a first sub-region; and
  - a second sub-region;
- a non-display region;
- pixel circuits comprising:
  - a first pixel circuit located in the first sub-region; and
  - a second pixel circuit located in the second sub-region;
- data lines comprising a first data line and a second data line, wherein the first data line is at least located in the first sub-region and only electrically connected to the first pixel circuit, and the second data line is at least located in the second sub-region and only electrically connected to the second pixel circuit; and
- control circuits located in the non-display region, wherein a control circuit of the control circuits is electrically connected to the first data line and the second data line,
- wherein the display panel comprises a first mode, in the first mode, a data voltage refresh frequency of the first sub-region is a first frequency, a data voltage refresh frequency of the second sub-region is a second frequency, the first frequency is different from the second frequency, the control circuit is configured to write a voltage to the first data line during scanning of the first sub-region, and write a voltage to the second data line during scanning of the second sub-region;
- wherein the control circuit is located on a side of the non-display region adjacent to the second sub-region and electrically connected to the first data line through a connection line, and the connection line is at least located in the second sub-region; and
- wherein each pixel circuit comprises a driving transistor and a threshold compensation transistor, the threshold compensation transistor comprises a first electrode and a second electrode, a gate electrode of the driving transistor is electrically connected to the second electrode of the threshold compensation transistor through an auxiliary connection segment, and the auxiliary connection segment and the second electrode of the threshold compensation transistor are connected at a first connection node, and
- wherein the connection line comprises a first segment located in the second sub-region and extending in a same direction as the second data line, a minimum distance between the first connection node in the second pixel circuit and the first segment is greater than a minimum distance between the first connection node in the second pixel circuit and the second data line.

2. The display panel according to claim 1, wherein the second frequency is greater than the first frequency.

3. The display panel according to claim 1, wherein
- a layer of the first segment is located on a side of a layer of the auxiliary connection segment toward a light-emitting direction of the display panel.

4. The display panel according to claim 3, wherein the pixel circuits are electrically connected to power supply signal lines, the power supply signal lines comprise a first power supply line and a second power supply line that are electrically connected to each other, and the first power supply line and the second power supply line extend in the same direction as the second data line, and
- wherein the first power supply line is disposed in a same layer as the auxiliary connection segment, a layer of the second power supply line is located on a side of the layer of the first power supply line toward the light-emitting direction of the display panel, and the first segment is disposed in a same layer as the second power supply line, or
- wherein the first power supply line is disposed in a same layer as the auxiliary connection segment, a layer of the second power supply line is located on a side of the layer of the first power supply line toward the light-emitting direction of the display panel, and a layer of the first segment is located on a side of the layer of the second power supply line toward the light-emitting direction of the display panel.

5. The display panel according to claim 1, wherein the first data line comprises a first end adjacent to the second data line, and
- wherein the connection line extends in the same direction as the second data line, one end of the connection line is connected to the control circuit, and the other end of the connection line is adjacent to the first end and is connected to the first end through a first connector.

6. The display panel according to claim 5, further comprising first wirings located in the first sub-region, wherein at least one of the first wirings is arranged in an extension direction of the connection line, wherein the first wirings receive a fixed voltage.

7. The display panel according to claim 1, wherein the first data line comprises a second end away from the second data line, and wherein one end of the connection line is connected to the control circuit, and the other end of the connection line is adjacent to the second end and is connected to the second end through a second connector.

8. The display panel according to claim 7, wherein the first data line further comprises a first end adjacent to the second data line, and wherein the connection line is further electrically connected to the first end through a third connector.

9. The display panel according to claim 7, wherein the second connector and the second end are connected by a first conductive via, the second connector and the connection line are connected by a second conductive via, and the first conductive via and the second conductive via are located on a side of the non-display region adjacent to the first sub-region.

10. The display panel according to claim 1, wherein the control circuit comprises a first switch and a second switch, input terminals of the first switch and the second switch are both electrically connected to a first source signal line, an output terminal of the first switch is electrically connected to the first data line, and an output terminal of the second switch is electrically connected to the second data line, and wherein the first switch is turned on during the scanning of the first sub-region, and the second switch is turned on during scanning of the second sub-region.

11. The display panel according to claim 1, wherein the control circuit comprises a third switch, the second data line and an input terminal of the third switch are both electrically connected to a first source signal line, an output terminal of the third switch is electrically connected to the first data line, and wherein the third switch is turned on during the scanning of the first sub-region, and the second frequency is greater than the first frequency.

12. The display panel according to claim 1, wherein the first pixel circuit comprises a plurality of first pixel circuits, the second pixel circuit comprises a plurality of second pixel circuits, the first data line comprises a plurality of first data lines, and the second data line comprises a plurality of second data lines, wherein the plurality of first pixel circuits are arranged in first circuit groups located in the first sub-region, the plurality of second pixel circuits are arranged in second circuit groups located in the second sub-region, each first circuit group comprises first pixel circuits arranged in a first direction, each second circuit group comprises second pixel circuits arranged in the first direction, and the first sub-region and the second sub-region are arranged in the first direction, wherein one of the first circuit groups is electrically connected to two of the first data lines, and one of the second circuit groups is electrically connected to two of the second data lines, wherein the control circuits comprise at least one switch group, each switch group corresponds to one of the first circuit groups and one of the second circuit groups and comprises two fourth switches and two fifth switches, input terminals of the two fourth switches and input terminals of the two fifth switches are electrically connected to a first source signal line, output terminals of the two fourth switches are electrically connected to two first data lines connected to the first circuit group corresponding to the switch group, and output terminals of the two fifth switches are electrically connected to two second data lines connected to the second circuit group corresponding to the switch group, wherein at least two of the fourth switches in the control circuits are turned on in the scanning of the first sub-region, and at least two of the fifth switches in the control circuits are turned on during the scanning of the second sub-region, and wherein the at least one switch group comprises at least two switch groups, the input terminals of the fourth switches and the input terminals of the fifth switches in the at least two switch groups are electrically connected to the first source signal line.

13. The display panel according to claim 1, further comprising a gating circuit, wherein the gating circuit is electrically connected to at least two control circuits of the control circuits, and is configured to transmit a voltage to the at least two control circuits in a time division manner.

14. The display panel according to claim 1, wherein each pixel circuit further comprises a data writing transistor, the data writing transistor is electrically connected to a first scan signal line and a first electrode of the driving transistor, the data writing transistor of the first pixel circuit is further electrically connected to the first data line, and the data writing transistor of the second pixel circuit is further electrically connected to the second data line, wherein the second frequency is greater than the first frequency, and in the first mode, and the scanning of the first sub-region and the scanning of the second sub-region are performed at the second frequency via the first scan signal line, wherein, in the first mode, a driving process of the first pixel circuit comprises a refreshing phase and a holding phase, a driving process of the second pixel circuit at least comprises a refreshing phase, a driving process of the display panel comprises a first frame and a second frame, in the first frame, the first pixel circuit and the second pixel circuit are in their refreshing phases, and in the second frame, the first pixel circuit is in the holding phase, and the second pixel circuit is in the refreshing phase, wherein, in the first frame, the control circuit writes a first data voltage to the first data line when the first scan signal line scans the first sub-region, and writes a second data voltage to the second data line when the first scan signal line scans the second sub-region, and wherein, in the second frame, the control circuit writes a preset voltage to the first data line when the first scan signal line scans the first sub-region, and writes the second data voltage to the second data line when the first scan signal line scans the second sub-region.

15. The display panel according to the claim 14, wherein, in the first mode, the driving process of the second pixel circuit further comprises a holding phase, the driving process of the display panel further comprises a third frame, and in the third frame, the first pixel circuit and the second pixel circuit are in their holding phases, and wherein, in the third frame, the control circuit writes the preset voltage to the first data line when the first scan signal line scans the first sub-region, and writes the preset voltage to the second data line when the first scan signal line scans the second sub-region.

16. The display panel according to claim 1, wherein each pixel circuit further comprises a bias transistor, the bias transistor is electrically connected to a second scan signal line and a first electrode of the driving transistor, the bias transistor of the first pixel circuit is further electrically connected to a first bias signal line, and the bias transistor of the second pixel circuit is further electrically connected to a second bias signal line, wherein, in the first mode, a driving process of the first pixel circuit comprises a refreshing phase and a holding phase, and a driving process of the second pixel circuit comprises a refreshing phase and a holding phase, and wherein, in the first mode, the first bias signal line provides different bias voltages in the refreshing phase and the holding phase of the first pixel circuit, and the second bias signal line provides different bias voltages in the refreshing phase and the holding phase of the second pixel circuit.

17. The display panel according to claim 1, wherein each pixel circuit further comprises an anode reset transistor, the anode reset transistor is electrically connected to a second scan signal line and an anode of a light-emitting element, the anode reset transistor in the first pixel circuit is further electrically connected to a first anode reset signal line, and the anode reset transistor in the second pixel circuit is further electrically connected to a second anode reset signal line, wherein, in the first mode, a driving process of the first pixel circuit comprises a refreshing phase and a holding phase, and a driving process of the second pixel circuit comprises a refreshing phase and a holding phase, and wherein the first anode reset signal line provides different anode reset voltages in the refreshing phase and the holding phase of the first pixel circuit, and the second anode reset signal line provides different anode reset voltages in the refreshing phase and the holding phase of the second pixel circuit.

18. A display apparatus, comprising a display panel, wherein the display panel comprises:

a display region comprising:

a first sub-region; and a second sub-region;

a non-display region;

pixel circuits comprising:

a first pixel circuit located in the first sub-region; and a second pixel circuit located in the second sub-region;

data lines comprising a first data line and a second data line, wherein the first data line is at least located in the first sub-region and only electrically connected to the first pixel circuit, the second data line is at least located in the second sub-region and only electrically connected to the second pixel circuit; and control circuits located in the non-display region, wherein a control circuit of the control circuits is electrically connected to the first data line and the second data line, wherein the display panel comprises a first mode, in the first mode, a data voltage refresh frequency of the first sub-region is a first frequency, a data voltage refresh frequency of the second sub-region is a second frequency, the first frequency is different from the second frequency, the control circuit is configured to write a voltage to the first data line during scanning of the first sub-region, and write a voltage to the second data line during scanning of the second sub-region;

wherein the control circuit is located on a side of the non-display region adjacent to the second sub-region and electrically connected to the first data line through a connection line, and the connection line is at least located in the second sub-region; and wherein each pixel circuit comprises a driving transistor and a threshold compensation transistor, the threshold compensation transistor comprises a first electrode and a second electrode, a gate electrode of the driving transistor is electrically connected to the second electrode of the threshold compensation transistor through an auxiliary connection segment, and the auxiliary connection segment and the second electrode of the threshold compensation transistor are connected at a first connection node, and wherein the connection line comprises a first segment located in the second sub-region and extending in a same direction as the second data line, a minimum distance between the first connection node in the second pixel circuit and the first segment is greater than a minimum distance between the first connection node in the second pixel circuit and the second data line.

* * * * *